United States Patent
Altieri et al.

(10) Patent No.: US 7,925,392 B2
(45) Date of Patent: Apr. 12, 2011

(54) AIRCRAFT VEHICULAR PROPULSION SYSTEM MONITORING DEVICE AND METHOD

(75) Inventors: Russell E. Altieri, Cary, NC (US);
James F. Kuhn, Erie, PA (US); Mark R. Jolly, Raleigh, NC (US); Steve C. Southward, Danville, VA (US); Askari Badre-Alam, Apex, NC (US); Leslie P. Fowler, Redondo Beach, CA (US); Matthew Ferguson, Fairview, PA (US)

(73) Assignee: LORD Corporation, Cary, NC (US)

( * ) Notice: Subject to any disclaimer, the term of this patent is extended or adjusted under 35 U.S.C. 154(b) by 552 days.

(21) Appl. No.: 12/099,461

(22) Filed: Apr. 8, 2008

(65) Prior Publication Data
US 2009/0055129 A1 Feb. 26, 2009

Related U.S. Application Data

(60) Continuation-in-part of application No. 11/224,563, filed on Sep. 12, 2005, now Pat. No. 7,389,162, which is a division of application No. 10/421,325, filed on Apr. 23, 2003, now Pat. No. 6,954,685, application No. 12/099,461, filed on Apr. 8, 2008, which is a continuation-in-part of application No. 10/965,085, filed on Oct. 14, 2004, now abandoned.

(60) Provisional application No. 60/374,752, filed on Apr. 23, 2002, provisional application No. 60/510,818, filed on Oct. 14, 2003.

(51) Int. Cl.
G01B 7/24 (2006.01)
G01L 3/00 (2006.01)
G06F 15/00 (2006.01)
(52) U.S. Cl. .......... 701/3; 701/29; 701/51; 73/862.333
(58) Field of Classification Search .......... 701/1, 3, 701/5, 29, 51; 702/151, 182; 73/862.332, 73/862.333, 866.1; 324/209
See application file for complete search history.

(56) References Cited

U.S. PATENT DOCUMENTS
1,975,918 A 10/1934 Berg
(Continued)

FOREIGN PATENT DOCUMENTS
EP 0591779 B1 6/1997
(Continued)

OTHER PUBLICATIONS

Corcoran et al., "A New Development in Continuous Torque Monitoring Couplings", Proc. of ASME DETC 2000 Power Transm. and Gearing Conf. Sep. 10-13, 2000, Baltimore, MD.

(Continued)

*Primary Examiner* — Tan Q Nguyen
(74) *Attorney, Agent, or Firm* — Edward F. Murphy, III

(57) ABSTRACT

Methods and systems for monitoring rotating shaft shafts and couplings in an aircraft propulsion system is described. The measurement system/method provides for accurate and precise monitoring of a rotating shaft flexible coupling in a fixed wing aircraft vehicle propulsion system. The measuring system/method provides for a high reliability short take off vertical landing fixed wing aircraft in which the vertical propulsion dynamically rotating drive shaft system and couplings are monitored in real time. The vehicular shaft coupling misalignment measuring system utilizes multiple positional sensors to provide highly reliable and precise determination of the dynamic characteristics of the rotating sensor target components of the propulsion system drive shaft. The relative position of the sensors is rigidly fixed externally from the rotating targets with a structural frame. The collar misalignment measuring system of the invention provide a misalignment measurement of the propulsion system drive shaft flexible coupling which relates to a critical performance of rotating shaft coupling in the operation of an aircraft vehicle. The method/system provides for monitoring a rotating drive shaft system and dynamically measuring a rotating drive shaft coupling in a fixed wing aircraft propulsion system.

7 Claims, 31 Drawing Sheets

U.S. PATENT DOCUMENTS

| | | | |
|---|---|---|---|
| 2,069,413 A | 2/1937 | Leadbetter | |
| 2,166,848 A | 7/1939 | Prudden | |
| 2,355,568 A | 8/1944 | Smith | |
| 2,442,347 A | 6/1948 | Eklund | |
| 2,541,159 A | 2/1951 | Geiger | |
| 2,586,043 A | 2/1952 | Hodgson et al. | |
| 3,046,781 A | 7/1962 | Pratt | |
| 3,087,568 A | 4/1963 | Kurtze | |
| 3,087,569 A | 4/1963 | Kurtze | |
| 3,117,054 A | 1/1964 | Antonucci | |
| 3,587,305 A | 6/1971 | Parkinson et al. | |
| 3,745,544 A | 7/1973 | Ono | |
| 3,783,522 A | 1/1974 | Dodd | |
| 3,824,848 A | 7/1974 | Parkinson | |
| 3,898,555 A | 8/1975 | Tellerman | |
| 3,956,973 A | 5/1976 | Pomplas | |
| 4,028,619 A | 6/1977 | Edwards | |
| 4,033,042 A | 7/1977 | Bently | |
| 4,050,266 A | 9/1977 | Bergman | |
| 4,071,818 A | 1/1978 | Krisst | |
| 4,115,925 A | 9/1978 | Malak | |
| 4,148,013 A | 4/1979 | Finn et al. | |
| 4,184,562 A | 1/1980 | Bakamjian | |
| 4,298,861 A | 11/1981 | Tellerman | |
| 4,319,189 A | 3/1982 | Cullum, Jr. et al. | |
| 4,392,681 A | 7/1983 | Raquet | |
| 4,518,917 A | 5/1985 | Oates et al. | |
| 4,534,526 A | 8/1985 | Metzger et al. | |
| 4,566,231 A | 1/1986 | Konsevich | |
| 4,630,033 A | 12/1986 | Baker | |
| 4,678,993 A | 7/1987 | Vinnemann et al. | |
| 4,721,902 A | 1/1988 | Tellerman et al. | |
| 4,746,859 A | 5/1988 | Malik | |
| 4,778,028 A | 10/1988 | Staley | |
| 4,803,427 A | 2/1989 | Mason et al. | |
| 4,803,885 A | 2/1989 | Nonomura et al. | |
| 4,811,609 A | 3/1989 | Nishibe et al. | |
| 4,828,202 A | 5/1989 | Jacobs et al. | |
| 4,828,203 A | 5/1989 | Clifton et al. | |
| 4,839,590 A | 6/1989 | Koski et al. | |
| 4,891,992 A | 1/1990 | Kobayashi et al. | |
| 4,901,947 A | 2/1990 | Raymer | |
| 4,907,462 A | 3/1990 | Obama et al. | |
| 4,939,937 A | 7/1990 | Klauber et al. | |
| 4,943,773 A | 7/1990 | Koski et al. | |
| 4,952,873 A | 8/1990 | Tellerman | |
| 4,972,441 A | 11/1990 | Roberts et al. | |
| 4,979,399 A | 12/1990 | Klauber et al. | |
| 5,017,867 A | 5/1991 | Dumais et al. | |
| 5,038,615 A | 8/1991 | Trulson et al. | |
| 5,043,685 A | 8/1991 | Nyce | |
| 5,076,100 A | 12/1991 | Hunter et al. | |
| 5,107,711 A | 4/1992 | Aoki et al. | |
| 5,115,195 A | 5/1992 | Peterson et al. | |
| 5,206,586 A | 4/1993 | Yauch et al. | |
| 5,206,838 A | 4/1993 | Kashiwase et al. | |
| 5,209,428 A | 5/1993 | Bevilaqua et al. | |
| 5,228,349 A | 7/1993 | Gee et al. | |
| 5,247,937 A | 9/1993 | Ophir et al. | |
| 5,275,356 A | 1/1994 | Bollinger et al. | |
| 5,311,124 A | 5/1994 | Hubbard et al. | |
| 5,312,069 A | 5/1994 | Bollinger et al. | |
| 5,313,159 A | 5/1994 | Allwine, Jr. | |
| 5,313,160 A | 5/1994 | Gloden et al. | |
| 5,320,305 A | 6/1994 | Oatway et al. | |
| 5,334,933 A | 8/1994 | Tellerman | |
| 5,363,317 A | 11/1994 | Rice et al. | |
| 5,367,255 A | 11/1994 | Nyce et al. | |
| 5,381,692 A | 1/1995 | Winslow et al. | |
| 5,420,589 A | 5/1995 | Wells et al. | |
| 5,430,432 A | 7/1995 | Camhi et al. | |
| 5,435,073 A | 7/1995 | Sullivan | |
| 5,449,418 A | 9/1995 | Takagi et al. | |
| 5,495,774 A | 3/1996 | Klauber et al. | |
| 5,508,609 A | 4/1996 | Parkinson et al. | |
| 5,514,952 A | 5/1996 | Parkinson | |
| 5,545,984 A | 8/1996 | Gloden et al. | |
| 5,587,680 A | 12/1996 | Smith | |
| 5,587,969 A | 12/1996 | Kroemer et al. | |
| 5,590,091 A | 12/1996 | Gloden et al. | |
| 5,675,095 A | 10/1997 | Ballantyne | |
| 5,705,769 A | 1/1998 | Hanson | |
| 5,712,447 A | 1/1998 | Hanson | |
| 5,717,330 A | 2/1998 | Moreau et al. | |
| 5,736,855 A | 4/1998 | Smith et al. | |
| 5,760,302 A | 6/1998 | Moradi et al. | |
| 5,796,247 A | 8/1998 | Pape | |
| 5,818,038 A | 10/1998 | Kerkmann et al. | |
| 5,877,420 A | 3/1999 | Moradi et al. | |
| 5,902,934 A | 5/1999 | Sprague et al. | |
| 5,922,952 A | 7/1999 | Moradi et al. | |
| 5,965,853 A | 10/1999 | Homsey | |
| 5,969,269 A | 10/1999 | Munyon et al. | |
| 5,998,899 A | 12/1999 | Rosen et al. | |
| 5,998,991 A | 12/1999 | Begin et al. | |
| 6,068,081 A | 5/2000 | Capdepuy et al. | |
| 6,119,807 A | 9/2000 | Benson, Jr. et al. | |
| 6,131,454 A | 10/2000 | Kopp et al. | |
| 6,294,912 B1* | 9/2001 | Kwun | 324/240 |
| 6,326,781 B1 | 12/2001 | Kunde et al. | |
| 6,351,117 B1 | 2/2002 | Ehling | |
| 6,366,531 B1 | 4/2002 | Varsamis et al. | |
| 6,369,563 B1 | 4/2002 | Krahe et al. | |
| 6,371,407 B1 | 4/2002 | Renshaw | |
| 6,389,887 B1 | 5/2002 | Dusserre-Telmon et al. | |
| 6,393,904 B1 | 5/2002 | Krug et al. | |
| 6,397,988 B1 | 6/2002 | Ptak | |
| 6,422,511 B1 | 7/2002 | Kalisz | |
| 6,427,308 B1 | 8/2002 | Brunken | |
| 6,439,067 B1 | 8/2002 | Goldman et al. | |
| 6,441,608 B2 | 8/2002 | Brunsch et al. | |
| 6,478,110 B1 | 11/2002 | Eatwell et al. | |
| 6,490,934 B2 | 12/2002 | Garshelis | |
| 6,516,286 B1 | 2/2003 | Aebischer et al. | |
| 6,536,555 B1 | 3/2003 | Kelsic et al. | |
| 6,538,429 B2 | 3/2003 | Schroeder et al. | |
| 6,581,720 B1 | 6/2003 | Chan et al. | |
| 6,700,304 B1 | 3/2004 | Fuller et al. | |
| 6,708,626 B2 | 3/2004 | Ueda et al. | |
| 6,757,635 B2 | 6/2004 | Topmiller | |
| 6,790,520 B1 | 9/2004 | Todd et al. | |
| 6,856,936 B1 | 2/2005 | Chen et al. | |
| 2001/0002791 A1* | 6/2001 | Tsuge et al. | 324/174 |
| 2001/0037911 A1 | 11/2001 | Stanienda | |
| 2002/0112549 A1 | 8/2002 | Cheshmehdoost et al. | |
| 2003/0000417 A1 | 1/2003 | Ueda et al. | |
| 2003/0146747 A1 | 8/2003 | Ehling | |
| 2004/0024499 A1 | 2/2004 | Altieri et al. | |

FOREIGN PATENT DOCUMENTS

| | | |
|---|---|---|
| EP | 0632250 B1 | 9/1999 |
| EP | 0732598 B1 | 5/2001 |
| EP | 0889316 B1 | 2/2003 |
| EP | 1059511 B1 | 6/2003 |
| EP | 0797105 B1 | 8/2004 |
| JP | 2002-303555 | 10/2002 |
| JP | 2002-365012 | 12/2002 |
| WO | 96/01410 | 1/1996 |
| WO | 98/34455 | 8/1998 |
| WO | 01/67412 | 9/2001 |

OTHER PUBLICATIONS

Edeal, "Trends in Fluid Power", Technical Paper, MTS Systems Corporation, Part No. 08-02, M1168 Revision A.

Russell, "Smaller, Lower Cost Magnetostrictive Position Sensors Open Up Consumer and Professional Product Applications", Tech. Ppr, MTS Sys. Corp., Part No. 08-02, M1162 Rev. A.

Russell, "Magnetostriction in Automotive Position Measurement", Technical Paper, MTS Systems Corporation, Part No. 08-02, M1163 Revision A.

Calkins et al., "Terfenol-D Sensor Design and Optimization", Aerospace Engineering and Engineering Mechanics Dept., Iowa State University, Ames, IA 50011.

Mancuso, "Just How Flexible is Your Flexible Coupling in Reality?", World Pumps Sep. 2000, Kop-Flex Emerson Power Transmission Corp.

Magnetrol, "Eclipse Guided Wave Radar", 2003.
Pratt & Whitney, "Pratt & Whitney Awarded $4 Billion JSF Engine Development Contract", Press Release Oct. 26, 2001.
TRW Aerospace, "Project Title: Design and Development of a Flexible Helicopter Driveline Denomstration Facility", Rev. 2.6, Aug. 28, 2002, p. 39.
Air Force Technology—JSF—Joint Strike Fighter, "JSF (F35) Joint Strike Fighter, International", The Website for Defence Industries—Air Force, Mar. 4, 2003.
Air Force Link website, "Lift Fan Installed in X-35B Joint Strike Fighter", Air Force News Archive, Jan. 12, 2001.
JSF X-35B Joint Strike Fighter, www.danshistory.com, Mar. 4, 2003.
Wilson, "Flexible Flier", popularmechanics.com, Mar. 4, 2003.
Mancuso, "Couplings as Part of a System", 1987 Annual seminar Vibration Institute Cincinnati Chapter, Oct. 8-9, 1987, pp. 207-225.
Automation & Proces Technologies, "The New Gemco Series 955S, Smart Brik (TM) & 955QD Brik with Quadrature Output LDT", www.patriotsensors.com, Apr. 23, 2003.
Amtek Patriot Sensors, "Stik (TM) Continuous Linear Position Sensor with Embedded DeviceNet Node", The Series 960 DN DeviceNet Stik (TM) Continuous Linear Position Sensor.
www.omega.com, "Force, Acceleration, & Torque", Apr. 16, 2003, pp. 1-4.
www.sensorland.com, "How They Work: Magnetostrictive Linear Position Sensors", Apr. 16, 2003, pp. 1-5.
home.t-online.de, Magnetostrictive Sensor for Displacement Measurement, Apr. 16, 2003, pp. 1-3.
www.commercial.mtslinearsensors.com, Temposonics Commercial Sensors, Apr. 16, 2003, pp. 1-8.
ww2.linkpath.com, "Sensor Application Ideas: Automotive Applications", Apr. 16, 2003, pp. 1-2.
www.products.mtslinearsensors.com, "F Style—Flexible Sensing element with Integral Element", Temposonics Sensors, Apr. 16, 2003, pp. 1-2.
www.products.mtslinearsensors.com, "D Style—Compact Hydraulic/Pneumatic Cylinder Mounted Sensors with Integral Electronics", Temopsonics Sensors, Apr. 16, 2003, pp. 1-3.
www.products.mtslinearsensors.com, "P Style—Externally mounted Profile Extrusion Sensors with Integral Electronics", Temposonics Sensors, Apr. 16, 2003, pp. 1-4.
www.products.mtslinearsensors.com, "H Style—Hydraulic/Pneumatic Cylinder Mounted Sensors with Integral Electronics", Temposonics Sensors, Apr. 16, 2003, pp. 1-2.
www.technology.mtslinearsensors.com, "Technology at Its Best", Temposonics Sensors, Apr. 16, 2003, p. 1.
PCT International Search Report from PCT application No. PCT/US2004/033848.
Delphion, English language abstract for EP0591779B1.
Delphion, English language abstract for EP0797105B1.
English translation of EP0797105. Created by USPTO Jan. 2007.
Office Action dated Mar. 26, 2009 from U.S. Appl. No. 10/965,085.

* cited by examiner

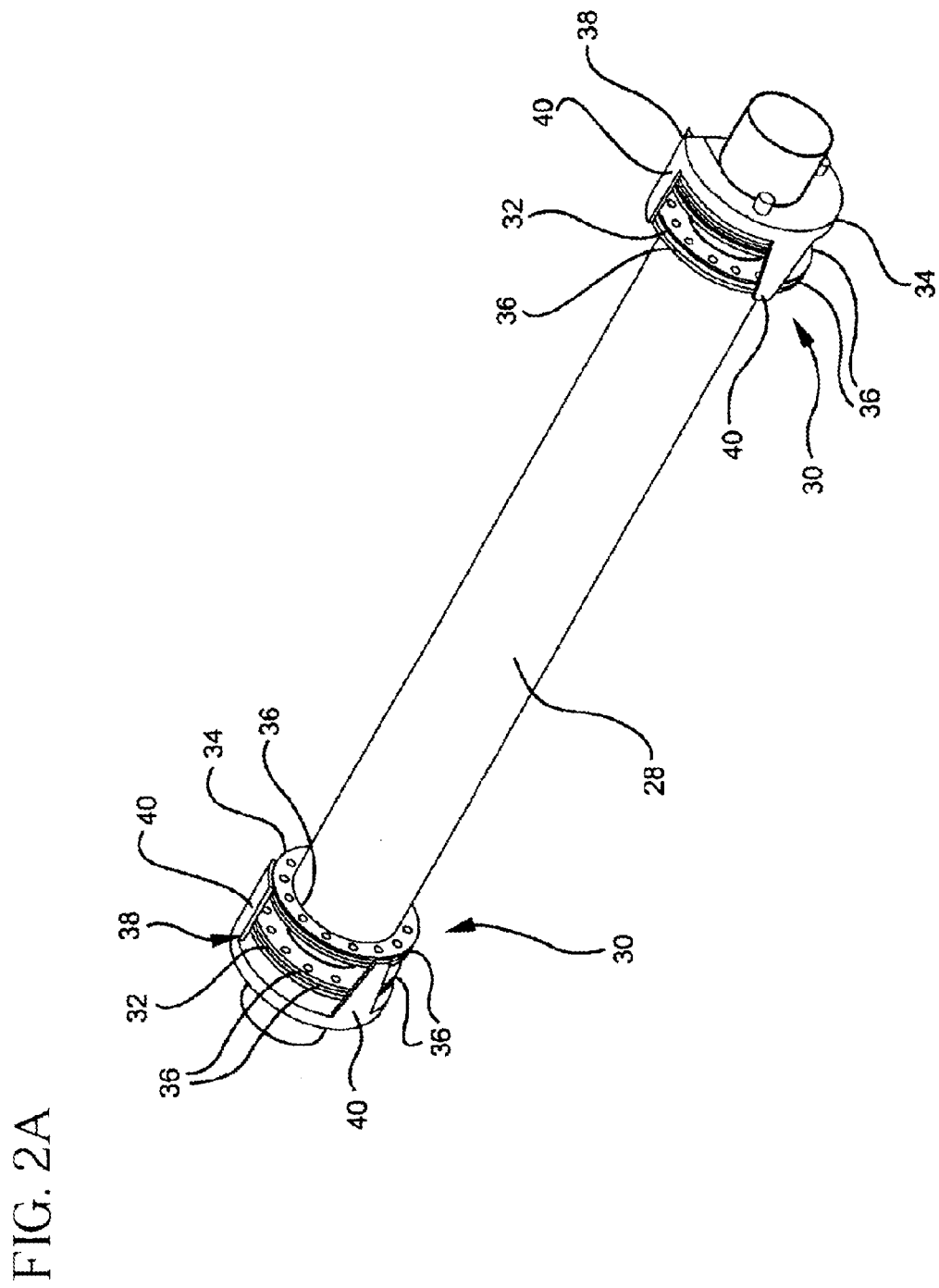

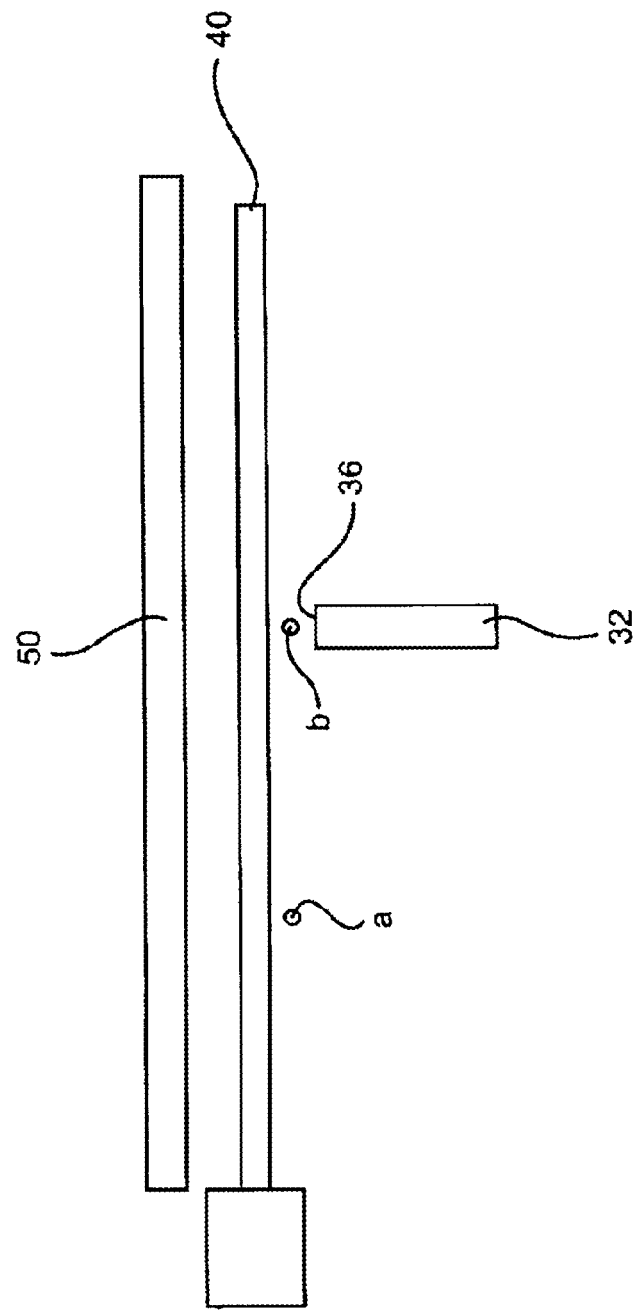

FIG. 7A
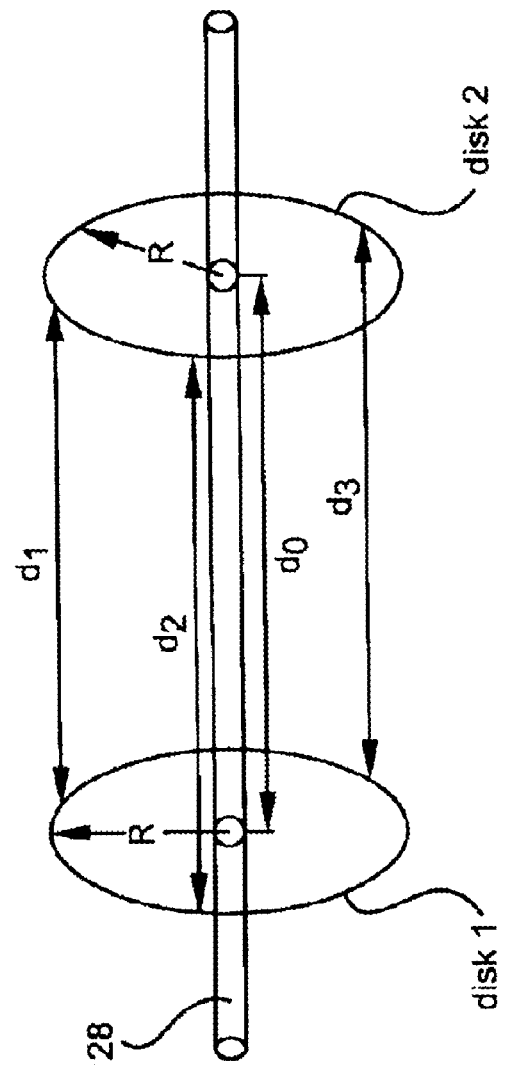
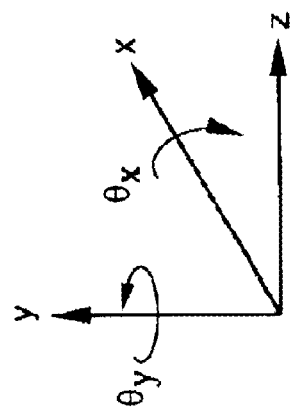

FIG.19A

Matlab Script Example 1

```
% establish search interval (a,b)
     a1 = tsamp(k1-3);
     b1 = tsamp(k1+3);

% Slide template according to bisection algorithm
     tol = 1e-6;
     % Compute cost function at the two search interval boundaries
     pulse_a1 = -syncgen( w0_est, a1, tsamp, pulsetype_est );
     pulse_b1 = -syncgen( w0_est, b1, tsamp, pulsetype_est );
     err_a1 = pulse_a1 - buf1;
     err_b1 = pulse_b1 - buf1;
     J_a1 = sum(err_a1 .* err_a1);
     J_b1 = sum(err_b1 .* err_b1);

z = 1; i = 0; del=9999;

while z; i = i+1;
          p1 = (a1 + b1) / 2;                            % Bisect ...
          pulse_p1 = -syncgen( w0_est, p1, tsamp, pulsetype_est );
          err_p1 = pulse_p1 - buf1;
          J_p1(i) = sum(err_p1 .* err_p1);               % and compute new cost function
          if (J_a1-J_p1(i)) < (J_b1-J_p1(i)),            % Decide which segment to bisect
next
               b1 = p1;  J_b1 = J_p1(i);
          else, a1 = p1;  J_a1 = J_p1(i);   end;
          if i>1; del = abs(J_p1(i) - J_p1(i-1)); end    % Decide if its time to stop
          if del < tol; z = 0; end;                      % Decide if its time
to stop
     end
```

FIG.19B

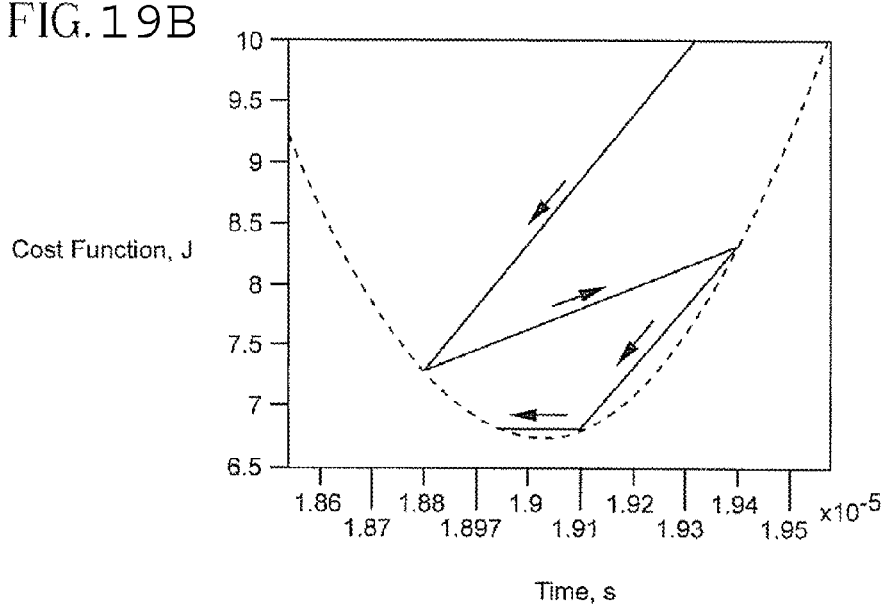

Cost Function, J

Time, s

AIRCRAFT VEHICULAR PROPULSION SYSTEM MONITORING DEVICE AND METHOD

CROSS REFERENCE

This application is a Continuation in Part (CIP) of U.S. patent application Ser. No. 11/224,563 filed on Sep. 12, 2005, now U.S. Pat. No. 7,389,162, issued Jun. 17, 2008, which is a divisional of U.S. patent application Ser. No. 10/421,325, filed Apr. 23, 2003, now U.S. Pat. No. 6,954,685, issued Oct. 11, 2005, which claims the benefit of U.S. Provisional Patent Application Ser. No. 60/374,752, filed Apr. 23, 2002, all three of which the benefit of are claimed and are incorporated by reference. This application is also a Continuation in Part (CIP) of U.S. patent application Ser. No. 10/965,085 filed on Oct. 14, 2004, now abandoned which claims the benefit of U.S. Provisional Patent Application 60/510,818, filed Oct. 14, 2003, both of which the benefit of are claimed and are incorporated by reference.

This invention was made with government support under contract (N0019-02-C-3003), awarded by the United States Department of Defense. The United States Government may have certain rights in this invention.

FIELD OF THE INVENTION

The present invention relates to a method/system for monitoring a rotating drive shaft system. More particularly the invention relates to a method/system for dynamically monitoring a rotating drive shaft coupling in a fixed wing aircraft propulsion system.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BACKGROUND OF THE INVENTION

Reference will now be made in detail to the present preferred embodiments of the invention, examples of which are illustrated in the accompanying drawings.

There is a need for a system and method of accurately and economically monitoring a rotating shaft coupling of a high speed rotating shaft system. There is a need for an economically feasible method of dynamically measuring a rotating shaft to provide dynamic real time monitoring of rotating positional characteristics of the rotating shaft and its rotating members. There is a need for a robust system and method of measuring rotational positional dynamic characteristics of a rotating drive shaft coupling in the propulsion system at a fixed wing vertical short take off and landing aircraft vehicle. There is a need for an economic aircraft vehicular propulsion system monitoring device and method.

SUMMARY OF THE INVENTION

In an embodiment, the invention includes a V/STOL (vertical short take off and landing) fixed wing aircraft having an aircraft propulsion system with an engine and a lift fan, with the engine coupled to the lift fan with at least one drive shaft and at least one flexible coupling, the flexible coupling comprised of a first coupling hub member including a magnetic target and a second coupling hub member including a magnetic target, the first coupling hub member flexibly coupled to the second coupling hub member, the flexible coupling providing for a mechanical transfer of motive power from the engine to the lift fan, and a flexible coupling sensor rigid collar misalignment measuring system encompassing the flexible coupling, the flexible coupling sensor rigid collar comprised of a first magnetostrictive sensor, a second magnetostrictive sensor, and a third magnetostrictive sensor, the first magnetostrictive sensor, the second magnetostrictive sensor, and the third magnetostrictive sensor rigidly fixed around the collar with the sensors external of the coupling hub member magnetic targets, the first magnetostrictive sensor fixed a first fixed angular distance from the second magnetostrictive sensor, the third magnetostrictive sensor fixed a second fixed angular distance from the second magnetostrictive sensor. The flexible coupling sensor rigid collar misalignment measuring system magnetostrictive sensors magnetically monitor a position of the first coupling hub member relative to a position of the second coupling hub member to provide a misalignment measurement of the flexible coupling which relates to a performance of the coupling in the V/STOL fixed wing aircraft.

In an embodiment, the invention includes an aircraft vehicle propulsion system, with the vehicle propulsion system comprising an engine and a drive unit propeller, with the engine coupled to the propeller with a drive shaft and a flexible coupling, the flexible coupling comprised of a first coupling hub member and a second coupling hub member, the first coupling hub member flexibly coupled to the second coupling hub member, the flexible coupling providing for a mechanical transfer of motive power from the engine to the propeller, a flexible coupling sensor rigid collar measurement system encompassing the flexible coupling, the flexible coupling sensor rigid collar measurement system comprised of a first sensor, a second sensor, and a third sensor, the first sensor, the second sensor, and the third sensor angularly spaced and rigidly fixed around the collar wherein the sensor rigid collar system monitors the flexible coupling and provides for a noncontact measuring of a plurality of positional characteristics of the first coupling hub member and the second coupling hub member which relate to the transfer of motive power.

In an embodiment, the invention includes a method of monitoring a vehicular propulsion system drive shaft flexible coupling. The method comprises providing a vehicular propulsion system drive shaft flexible coupling with a first coupling hub member with a sensor target and a second coupling hub member with a sensor target, providing a flexible coupling sensor rigid collar measurement system with a first sensor, a second sensor, and a third sensor, encompassing the first coupling hub member sensor target and the second coupling hub member sensor target with the flexible coupling sensor rigid collar measurement system while inhibiting a physical contact between the flexible coupling sensor rigid collar measurement system and the vehicular propulsion system drive shaft flexible coupling, with the first sensor, the second sensor, and the third sensor angularly spaced around and external from the flexible coupling, and noncontactingly measuring a plurality of positional characteristics of the first coupling hub member and the second coupling hub member to monitor a performance of the vehicular propulsion system drive shaft flexible coupling which relates to a transfer of motive power through the vehicular propulsion system drive shaft flexible coupling.

In an embodiment, the invention includes a method of monitoring a drive shaft coupling. The method including providing a drive shaft coupling with a first coupling hub member with a sensor target and a second coupling hub member with a sensor target, providing a coupling sensor rigid collar measurement system with a first sensor, a second sensor, and a third sensor, encompassing the first coupling hub member sensor target and the second coupling hub member sensor target with the coupling sensor rigid collar measurement system while inhibiting a physical contact between the coupling sensor rigid collar measurement system and the drive shaft coupling, with the first sensor, the second sensor, and the third sensor angularly spaced around the coupling, and noncontactingly measuring a plurality of positional characteristics of the first coupling hub member and the second coupling hub member to monitor a performance of the drive shaft coupling which relates to a transfer of motive power through the drive shaft coupling.

In an embodiment, the invention includes a method of monitoring a coupling drive shaft system. The method including providing a drive shaft coupling system with a first rotating member with a sensor target and a second rotating member with a sensor target, providing a sensor rigid collar measurement system with a first sensor, a second sensor, and a third sensor, encompassing said first rotating member sensor target and said second rotating member sensor target with said sensor rigid collar measurement system while inhibiting a physical contact between said collar measurement system and said rotating members, with said first sensor, said second sensor, and said third sensor angularly spaced around said rotating members, noncontactingly measuring a plurality of rotating positional characteristics of said first rotating member and said second rotating member to monitor a performance of said drive shaft system which relates to a transfer of motive power through said drive shaft system, providing for a correction change in said drive shaft system when a measured rotating positional characteristic performance of said drive shaft system exceeds a measured rotating positional characteristic performance limitation.

In an embodiment, the invention includes a shaft coupling measurement system for noncontactingly monitoring a coupling, with the coupling comprised of a first coupling hub member including a electromagnetic target and a second coupling hub member including a electromagnetic target, the first coupling hub member flexibly coupled to the second coupling hub member, a coupling sensor rigid collar misalignment measuring system encompassing the coupling, with the coupling sensor rigid collar comprised of a first electromagnetic magnetostrictive sensor, a second electromagnetic magnetostrictive sensor, and a third electromagnetic magnetostrictive sensor, the first sensor, the second sensor, and the third sensor rigidly fixed around the collar, the first sensor fixed a first fixed angular distance from the second sensor, the third sensor fixed a second fixed angular distance from the second sensor, and the coupling sensor rigid collar measuring system sensors noncontactingly monitor a position of the first coupling hub member relative to a position of the second coupling hub member to provide a measurement of the coupling which relates to a performance of the coupling.

In an embodiment, the invention includes a method of monitoring a drive shaft system. The method includes providing a drive shaft system with a first rotating member with a magnetic sensor target and providing a sensor rigid measurement system with a magnetostrictive sensor proximate the first rotating member sensor target while inhibiting a physical contact between the measurement system magnetostrictive sensor and the rotating member, magnetostrictively measuring a rotating positional characteristic of the first rotating member to monitor a performance of the drive shaft system.

In an embodiment, the invention includes a rotating shaft measurement system for noncontactingly monitoring a rotating member including a magnetic sensor target, with the rotating shaft measurement system including a sensor rigid collar comprised of a first magnetostrictive sensor. The first magnetostrictive sensor is rigidly fixed on the sensor rigid collar proximate the rotating member, wherein the sensor rigid collar measurement system first magnetostrictive sensor noncontactingly magnetostrictively monitors a position of the rotating member sensor target to provide a measurement of a rotating positional characteristic of the first rotating member to monitor a performance of the rotating member.

BRIEF DESCRIPTION OF THE DRAWINGS

FIGS. 2A-2B show enlarged views of an aircraft vehicular rotating shaft system.
FIGS. 6A-6D show sensor systems.
FIGS. 7A-7C illustrate sensor measurement systems and methods.
FIGS. 19A-19B illustrate measurement methods.

DETAILED DESCRIPTION OF THE PREFERRED EMBODIMENT

In an embodiment the invention includes a short take off and vertical landing (V/STOL Vertical Short Take Off and Landing) fixed wing aircraft having an aircraft propulsion system with an engine and a lift fan, with the engine coupled to the lift fan with at least one drive shaft and at least one flexible coupling, the flexible coupling comprised of a first coupling hub member including a magnetic target and a second coupling hub member including a magnetic target, the first coupling hub member flexibly coupled to the second coupling hub member, the flexible coupling providing for a mechanical transfer of motive power from the engine to the lift fan, and a flexible coupling sensor rigid collar misalignment measuring system encompassing the flexible coupling, the flexible coupling sensor rigid collar comprised of a first magnetostrictive sensor, a second magnetostrictive sensor, and a third magnetostrictive sensor, the first magnetostrictive sensor, the second magnetostrictive sensor, and the third magnetostrictive sensor rigidly fixed around the collar, the first magnetostrictive sensor fixed a first fixed angular distance from the second magnetostrictive sensor, the third magnetostrictive sensor fixed a second fixed angular distance from the second magnetostrictive sensor. The flexible coupling sensor rigid collar misalignment measuring system magnetostrictive sensors magnetically monitor a position of the first coupling hub member relative to a position of the second coupling hub member to provide a misalignment measurement of the flexible coupling which relates to a performance of the coupling in the V/STOL fixed wing aircraft.

Figure 1A:
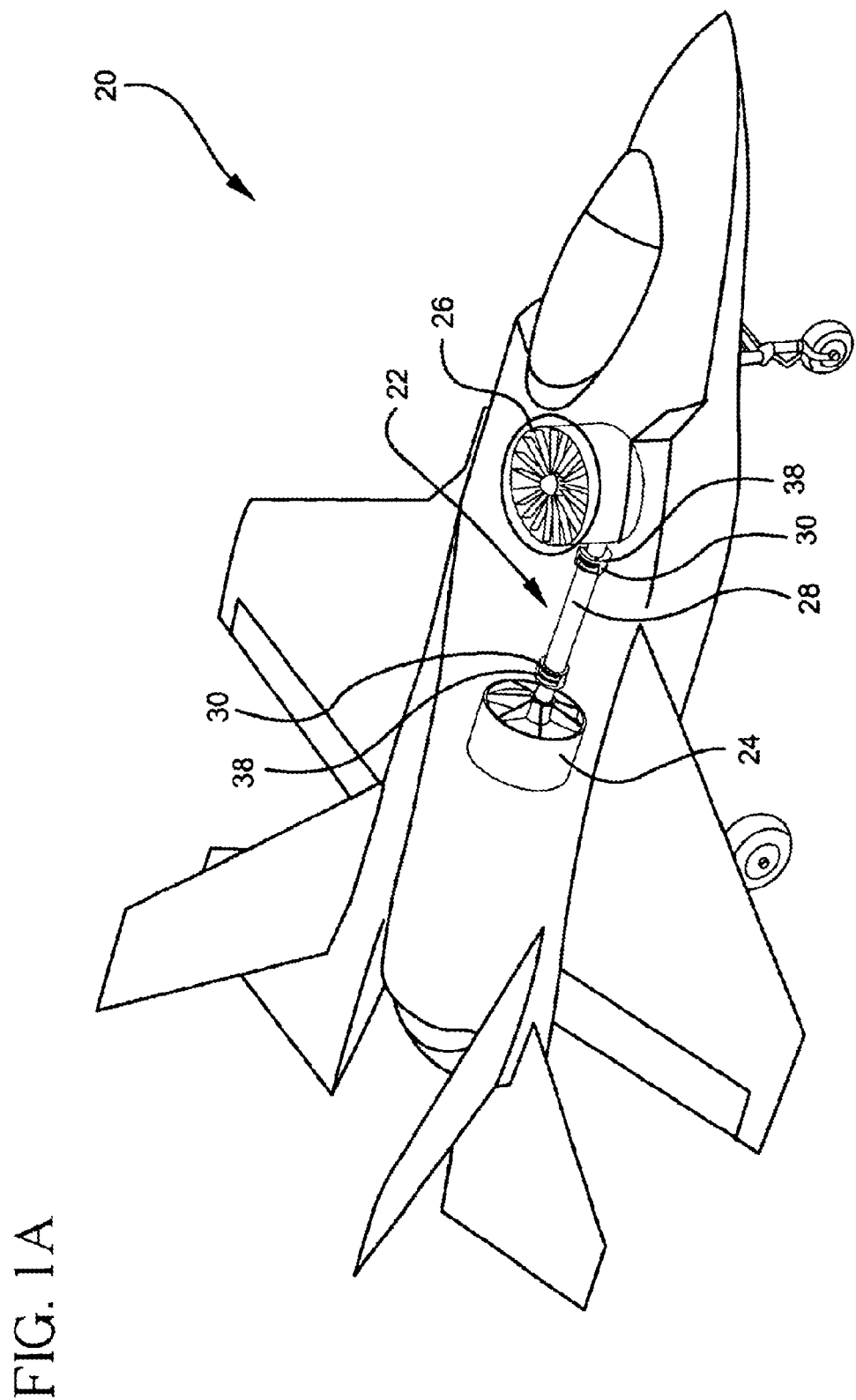
FIGS. 1A-1B show schematic views of an aircraft.
Figure 1B:
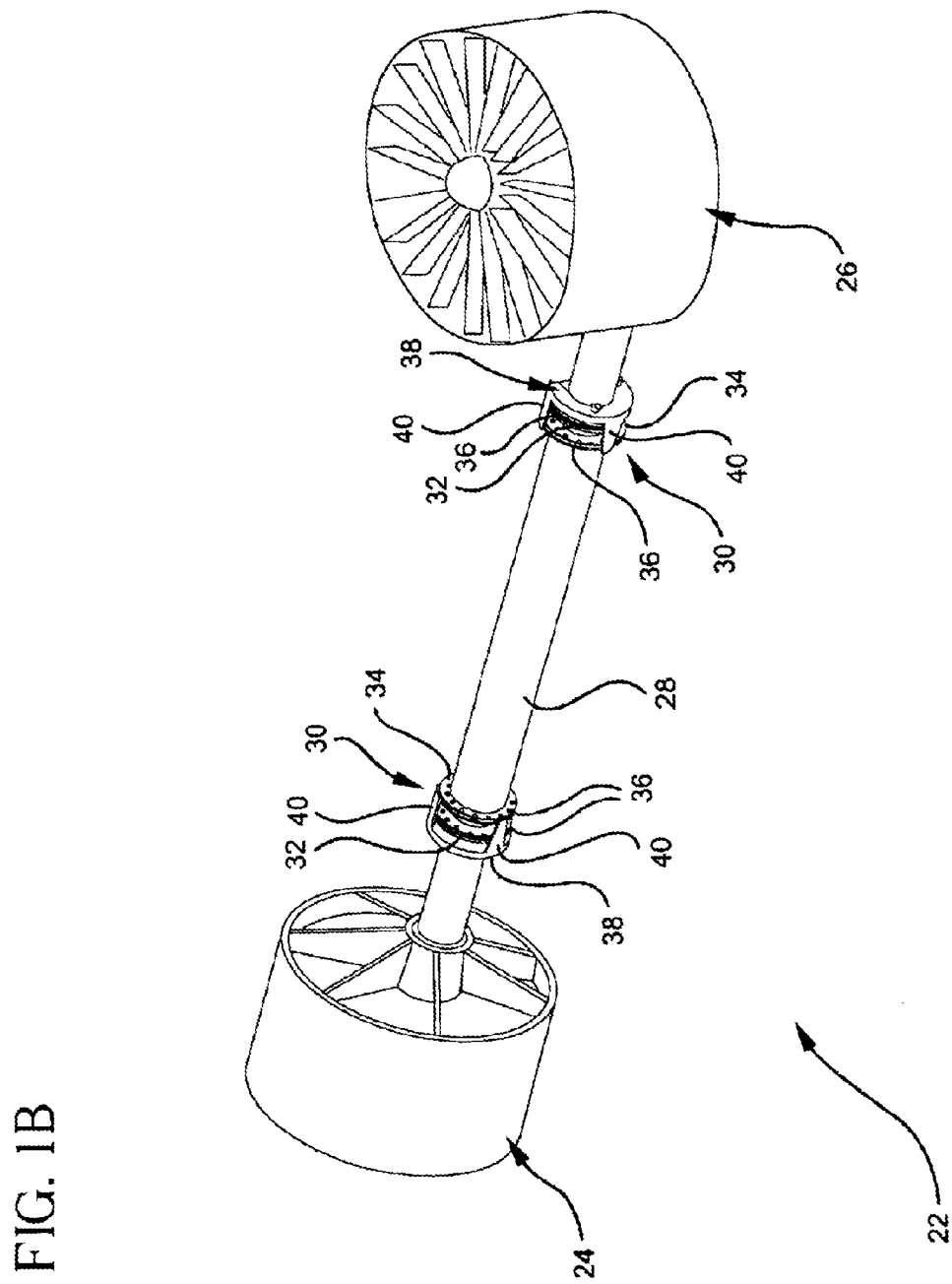
Figure 2B:
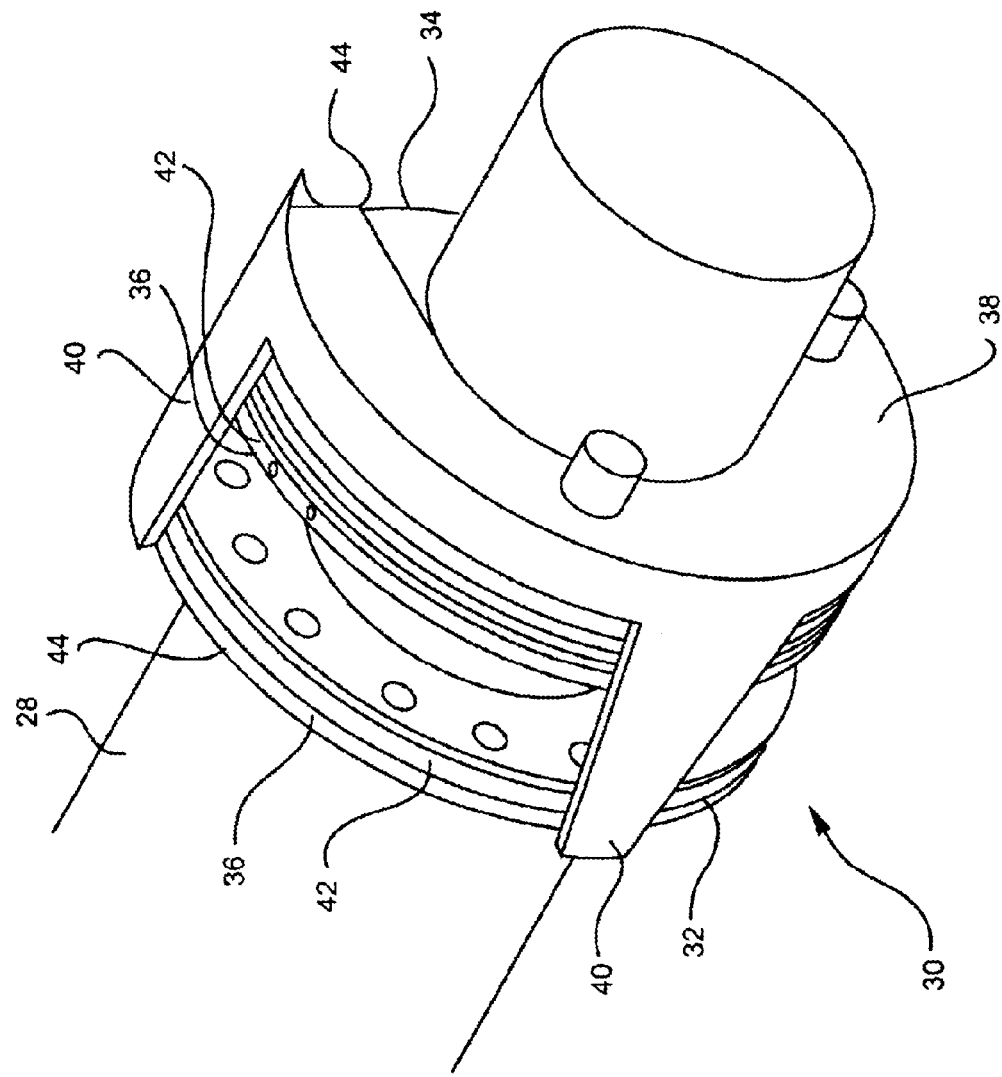

As shown in FIG. 1, in an embodiment the invention includes a short take off and vertical landing (V/STOL Vertical Short Take Off and Landing) fixed wing aircraft 20 having an aircraft propulsion system 22 with an engine 24 and a lift fan 26, with the engine coupled to the lift fan with at least one drive shaft 28 and at least one flexible coupling 30. As shown in FIG. 1B, flexible coupling 30 is comprised of a first coupling hub member 32 and a second coupling hub member 34. The coupling hub members include sensor targets 36, preferably the sensor targets have magnetic properties, and preferably are comprised of a magnetically conducting material or are comprised of at least one magnet. The preferred magnetically conducting materials are ferrous, preferably ferrous metals of iron or steel. The preferred at least one magnet is a permanent magnet. Sensor targets 36 preferably are electromagnetic (EM) radiation spectrum detectable sensor targets which can be detected by electromagnetic sensors 40, most preferably sensor targets 36 are magnetic property targets which can be detected by an EM magnetostrictive sensor 40. The first coupling hub member 32 including its sensors target 36 is flexibly coupled to the second coupling hub member 34 which includes a sensor target 36 with the flexible coupling providing for a mechanical transfer of motive power from engine 24 to lift fan 26. The invention includes a coupling sensor rigid collar misalignment measuring system 38 encompassing flexible coupling 30. Flexible coupling sensor rigid collar measuring system 38 is comprised of a first EM sensor 40, a second EM sensor 40, and a third EM sensor 40. Preferably, the EM sensors 40 are magnetostrictive sensors. First, second, and third magnetostrictive sensors 40 are rigidly fixed around collar 38 with the magnetostrictive sensors external from the magnetostrictive sensor targets 36 with first sensor 40 fixed a first fixed angular spacing distance from second sensor 40 and third sensor 40 fixed a second fixed angular spacing distance from second sensor 40. Preferably first, second, and third magnetostrictive sensors 40 are equally spaced apart with the first fixed angular spacing distance equal to the second fixed angular spacing distance. Sensors 40 are rigidly fixed and spaced apart at angular spacing distances around collar 38 to provide for sensing a sensed reference plane for first coupling hub member 32 and a sensed reference plane for second coupling hub member 34. First, second, and third magnetostrictive sensors 40 are spaced apart and external from sensor targets 36 which sensors 40 detecting the position of sensor targets 36 along their longitudinal lengths. First, second, and third magnetostrictive sensors 40 are angularly spaced around sensor targets 36 with sensors 40 detecting the position of sensor targets 36 along their longitudinal magnetostrictive waveguide body lengths to provide a first measured distance between the sensor targets 36, a second measured distance between the sensor targets 36, and a third measured distance between the sensor targets 36, that provide a plurality of simultaneous measured distances from the rotating shaft first coupling hub member 32 to the rotating shaft second coupling hub member 34 that are than transformed into an angular misalignment angle and an axial displacement distance for the rotating shaft coupling 30. In a preferred embodiment as shown in FIG. 2, the fixed angular distances are about 120°. Preferably fixed angular distances spacing of spacing of sensors 40 is at least 45°. Preferably the fixed angular distance of sensors 40 is in the range of 60° to 120°. Preferably, sensor rigid collar measuring system 38 has at least three sensors 40. In a preferred embodiment sensor rigid collar measuring system 38 has four sensors 40. In a preferred embodiment sensor rigid collar measuring system 38 has five sensors 40. Preferably rigid collar measuring system 38 has "n" sensors with n≧3 and the "n" sensors separated by a fixed angular distance Øn with Øn≧90°/(n−1), more preferably Øn≧120°/(n−1). Magnetostrictive sensors 40 rigidly fixed and spaced apart on collar 38 utilize magnetism to monitor a position of first coupling hub member 32 relative to a position of a second coupling hub member 34 to provide a misalignment measurement of flexible coupling 30 with relates to the performance of coupling 30 in aircraft vehicle 20 and the transfer of propulsion system power from engine 24 to propelling drive unit rotor lift fan 26. Sensors 40 magnetically detect the position of the coupling hub member target, preferably utilizing magnetostriction deformation within the sensors.

Figure 3:
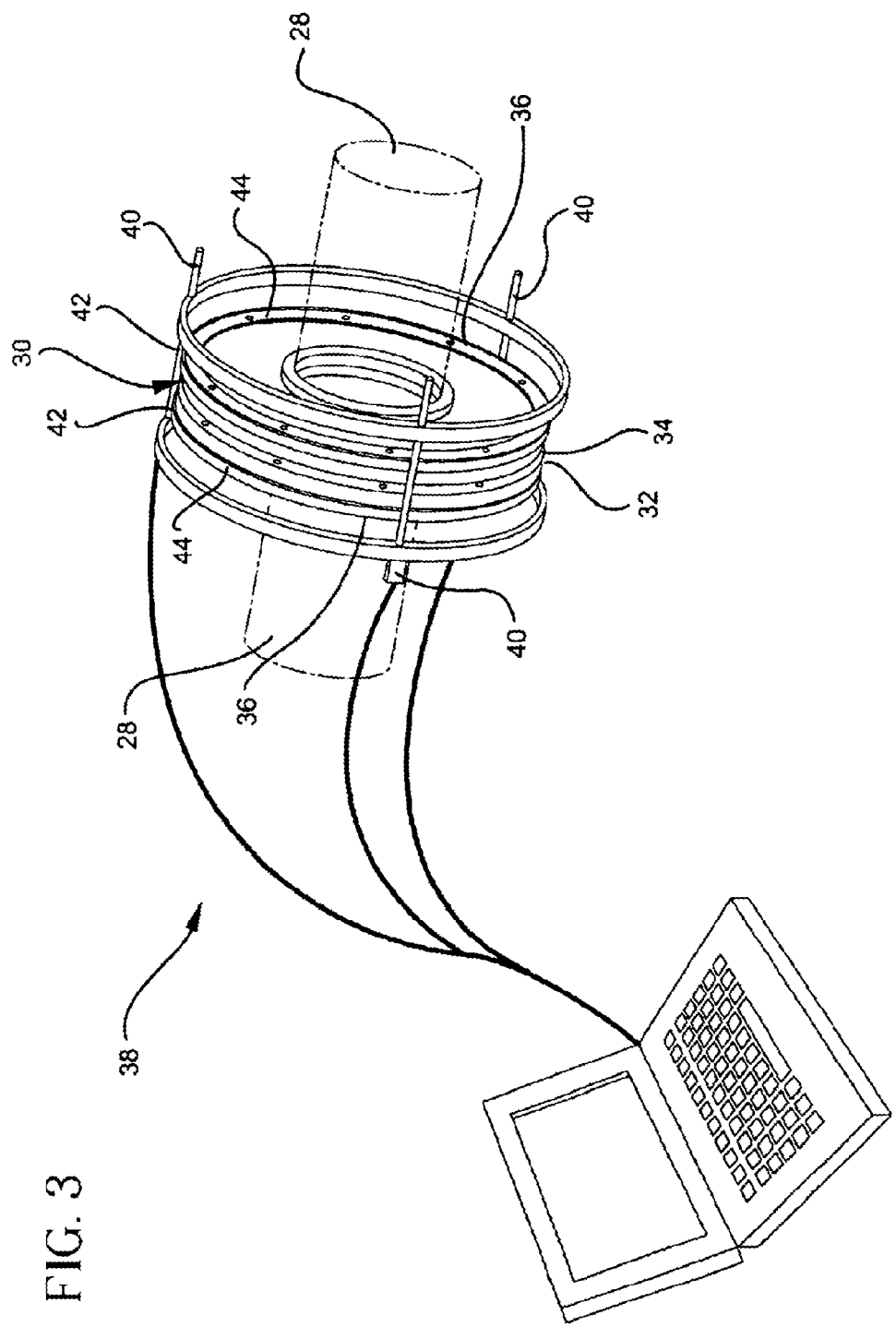
FIG. 3 shows a sensor system.
Figure 4:
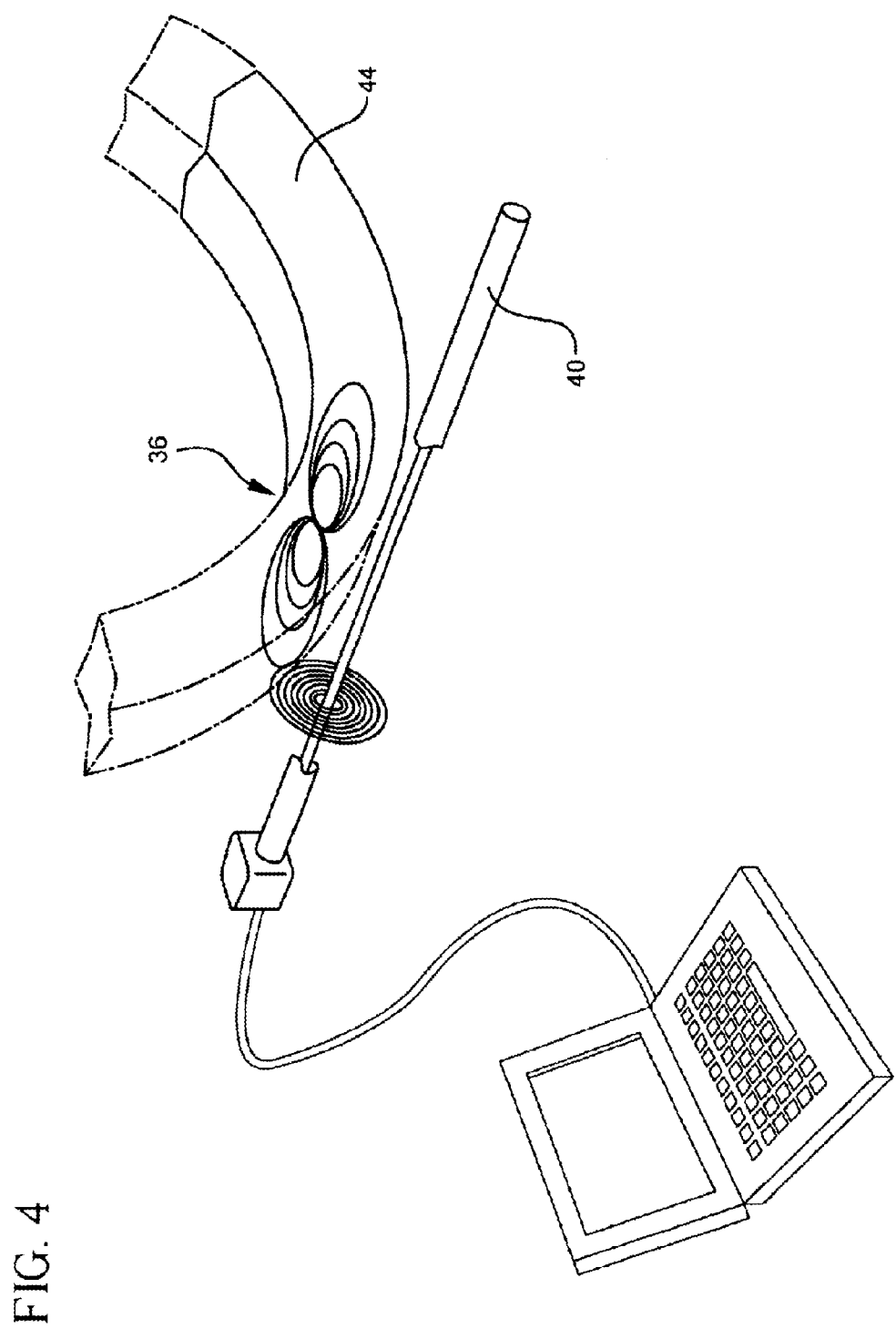
FIG. 4 shows a sensor system.

As shown in FIG. 1-2, the engine 24 output shaft is coupled through a first coupling 30 with a coupling sensor rigid collar misalignment measurement system 38 to a first end of drive shaft 28. At the other end of rotating drive shaft 28, drive shaft 28 is coupled through a second rotating coupling 30 with a coupling sensor rigid collar misalignment measurement system 38 to the rotating input shaft of lift fan 26 with engine 24 driving the rotation of lift fan 26. The second coupling shaft is inputted into a clutch that turns lift fan 26 that provides vertical thrust for aircraft vehicle 20 that allows for short take off and vertical landing of the aircraft. Coupling sensor rigid collar measurement system 38 provides accurate and precise noncontact measuring and monitoring of the performance of coupling 30 in the operation of the aircraft. The flexible coupling sensor rigid collar misalignment measuring system magnetostrictive sensors 40 magnetically monitor a position of the first coupling hub member 32 relative to a position of the second coupling hub member 34 to provide a misalignment measurement of the flexible coupling 30, and its drive shafts, which relates to the performance of the coupling in the aircraft. FIG. 3 shows an embodiment of the invention with three magnetostrictive sensors 40 equally spaced around the collar of coupling sensor rigid misalignment measurement system 38 with the sensors fixed with an angular distance of about 120 degrees. FIG. 4 shows magnetostrictive sensor 40 noncontactingly electromagnetically sensing hub member sensor target 36 with the interaction of magnetic fields. In a preferred embodiment of the invention the magnetostrictive sensor 40 is used to magnetostrictively determine the location of magnetic ring 44 of sensor target 36 along the longitudinal length of magnetostrictive sensor element body. Preferably the magnetostrictive sensors 40 are used to determine the location of two separated rotating shaft coupling hub members (32, 34) by magnetostrictively determining the location of two magnetic rings 44 of two separated rotating shaft sensor targets 36 along the longitudinal length of the magnetostrictive sensor element body. An electromagnetic interrogation pulse from the magnetostrictive sensor element head forms an interrogation pulse magnetic field along the entire length of the sensor element body which interacts with the rotating sensor target 36 magnetic field of the coupling hub sensor target magnetic ring 44 to form a magnetically induced strain pulse wave in the sensor 40. From its interacting magnetic fields (interaction of interrogation pulse magnetic field with the magnetic field of the rotating coupling hub sensor target magnetic ring) induced origination point the magnetically induced strain pulse wave travels at sonic speed along the magnetostrictive sensor waveguide body length to the sensor element detection head sense EM coil. The magnetically induced strain pulse wave travel time is used to determine the length of the travel along the sensor 40 that indicates the position of the induced origination point along the length of sensor waveguide body and the position of the coupling hub sensor target magnetic ring. Preferably the travel times of two magnetically induced strain pulse waves from the two separated sensor target magnetic rings 44 is utilized to monitor the separation distance between the two separated rotating shaft coupling hub members (32, 34).

FIG. 6A-D show embodiments of the invention which utilize a magnetically biased magnetostrictive sensor 40 to magnetostrictively detect the magnetic property sensor target 36 of rotating coupling hub member 32. Bias magnet 50 is provided proximate magnetostrictive sensor 40 to produce a magnetic field proximate magnetically conducting ferrous material hub member sensor target 36. Bias magnet 50 and rotating moving magnetically conducting ferrous sensor target 36 form a magnetic circuit with magnetically conducting ferrous sensor target 36 creating a field concentration in magnetostrictive sensor 40 at its location along the longitudinal length of magnetostrictive sensor 40 to provide for magnetostrictive detection of the target. With such an embodiment the magnetic sensor target 36 of rotating coupling hub member 32 does not need to include a permanent magnet, preferably with the magnetic sensor target 36 being the ferrous material which forms part of rotating coupling hub member 32. Permanent bias magnet 50 bias the magnetostrictive sensor 40 such that there is no relative motion between the permanent bias magnet and the magnetostrictive sensor. The magnetically conducting ferrous target moving in proximity to the magnetically-biased magnetostrictive sensor 40 creates local magnetic field concentrations at the sensor waveguide body that cause magnetically induced strain pulse wave acoustic reflections within the magnetostrictive material sensor waveguide body thus providing position measurement of the target 36 along the longitudinal length of magnetostrictive sensor 40. Such an embodiment of the invention eliminates the need for a moving permanent magnet ring 44 incorporated into rotating coupling hub members 32, 34, since the magnetic property magnetically conducting ferrous material component of the rotating members is the magnetostrictive sensor target 36. In preferred embodiments the biasing magnet 50 subjects the magnetostrictive sensor 40 to a magnetic field in the range of 10-50 G (such as at point a in FIG. 6A), and the magnetically conducting ferrous target 36 creates local magnetic field concentrations in the range of 100-200 G proximate sensor 40 at its longitudinal location along the sensor body (such as at point b in FIG. 6A).

Preferably the first coupling hub member 32 has an outer circumference perimeter 42 and the first coupling hub member magnetic target 36 comprises a magnetic ring 44 proximate the first coupling hub member outer circumference perimeter and the second coupling hub member 34 has an outer circumference perimeter 42 and the second coupling hub member magnetic target 36 comprises a magnetic ring 44 proximate the second coupling hub member outer circumference perimeter. Preferably the first magnetostrictive sensor 40 extends over the first coupling hub member magnetic ring 44 and the second coupling hub member magnetic ring 44, the second magnetostrictive sensor 40 extends over the first coupling hub member magnetic ring 44 and the second coupling hub member magnetic ring 44, and the third magnetostrictive sensor 40 extends over the first coupling hub member magnetic ring 44 and the second coupling hub member magnetic ring 44. The magnetic ring 44 can be a continuous magnet or segmented magnets. It is desirable to keep the magnetic field around the perimeter of the ring as uniform as possible and it is preferred to minimize the number of segments and minimize any gap between segments. Such gaps can be reduced by using scarf-cut ends on the magnets (magnets cut at 45° on the ends and butted against one another during installation into the ring on the hub). In an embodiment the magnetic ring rotating member sensor target is the rotating coupling hub member itself, preferably with such rotating member sensor target coupling hubs being ferrous. In an embodiment the magnetic ring rotating member sensor target is the rotating coupling hub member itself, preferably with such rotating member sensor target coupling hubs being magnetic. The coupling hub members can be non-ferrous with a separate magnetic ring sensor target being combined with a nonmagnetic nonferrous hub member. The magnetic ring is proximate the coupling hub member outer circumference perimeter. In an embodiment the magnetic ring is on the outer perimeter of the hub. In an embodiment the magnetic ring is integrated into the non-ferrous titanium hub proximate the outer perimeter and distal from drive shaft inner axis and not actually on the hub outer circumference perimeter. Preferably the first magnetostrictive sensor 40 is fixed in longitudinally parallel alignment with the second magnetostrictive sensor 40 and the third magnetostrictive sensor 40 is fixed in longitudinally parallel alignment the second magnetostrictive sensor 40, with the third magnetostrictive sensor 40 fixed in longitudinally parallel alignment with the first magnetostrictive sensor 40. The sensors 40 are preferably longitudinally aligned in parallel. In an embodiment the longitudinally aligned sensors 40 are straight. In an embodiment the longitudinally aligned sensors 40 are curved. In a curved sensor embodiment the longitudinally aligned sensors 40 are curved such that the sensors bulge out in the vicinity of the hub members and the ends are radially closer to the drive shafts. With curved sensor embodiments the longitudinally aligned sensors 40 have a curvature that avoids and inhibits physical contact with a rotating shaft system component such as a hub member, a flexible coupling member, a shaft member, or other nearby components. Preferably the first coupling hub member 32 defines a plane, such as Plane 1 of FIG. 5, and the second coupling hub member 34 defines a plane, such as Plane 2 of FIG. 5, with the flexible coupling sensor rigid collar misalignment measuring system 38 noncontactingly measuring with the magnetostrictive sensors 40 a plurality of distances from the first coupling hub member rotating sensor target to the second coupling hub member rotating sensor target to provide a misalignment angle $\theta_{misalignment}$ between the first rotating coupling hub member plane and the second rotating coupling hub member plane. Preferably the flexible coupling sensor rigid collar misalignment measuring system 38 encompassing the flexible coupling 30 is physically separated from the flexible coupling 30 wherein physical mechanical contact between the flexible coupling sensor rigid collar misalignment measuring system 38 and the flexible coupling 30 is inhibited. Preferably flexible coupling 30 couples a first drive shaft 28 to a second drive 28 with the magnetostrictive sensor fingers 40 fixed on annular support members of collar 38 with the sensor fingers 40 in parallel longitudinal alignment with the drive shafts, with such alignment substantially parallel with the drive shafts when the misalignment angle is not zero. In a preferred embodiment the flexible coupling sensor rigid collar 38 is a continuous uninterrupted ring, preferably with the collar comprising a complete circle with sensors 40 at 120 degrees fixed angular distances. In a preferred alternative embodiment the flexible coupling sensor rigid collar 38 is an interrupted ring, such as horseshoe arc cradle, with sensors 40 at fixed angular distances less than 120 degrees.

In an embodiment the invention includes a monitored vehicle propulsion system. The propulsion system 22 comprises an engine 24 and a propeller 26 for producing a propelling motive force. The engine 24 is coupled to propeller 26 such as a lift fan, a rotor, a drive unit, or other mover that produces a thrust or force for propelling and controlling the motion of the vehicle. The engine 24 is coupled to the propeller 26 with a drive shaft 28 and at least one flexible coupling 30. The flexible coupling 30 is comprised of a first coupling hub member 32 and a second coupling hub member 34 with the first coupling hub member flexibly coupled to the second coupling hub member. The flexible coupling 30 provides for the mechanical transfer of motive power from the engine 24 to the propeller 26. The propulsion system includes a flexible coupling sensor rigid annular collar measurement system 38 encompassing the flexible coupling 30 with the flexible coupling sensor rigid collar measurement system 38 comprised of a first electromagnetic EM sensor 40, a second electromagnetic EM sensor 40, and a third electromagnetic EM sensor 40, with the first sensor, the second sensor, and the third sensor angularly spaced and rigidly fixed around the collar wherein the sensor rigid collar system 38 monitors the flexible coupling and provides for a noncontact electromagnetic measuring of multiple positional characteristics of the first coupling hub member 32 and the second coupling hub member 34 which relate to the transfer of motive power from the engine to the propeller. Preferably, the EM sensors 40 are magnetostrictive sensors. Sensors 40 are rigidly fixed around collar 38 with first sensor 40 fixed a first fixed angular distance from second sensor 40 and the third sensor 40 fixed a second fixed angular distance from the second sensor 40. Preferably the first, second, and third sensors 40 are equally spaced apart with the first fixed angular distance equal to the second fixed angular distance. In a preferred embodiment the fixed angular distances spacing of sensors 40 is in the range of 60° to 120°. Preferably, sensor rigid collar measuring system 38 has at least three sensors 40. In a preferred embodiment system 38 has four sensors 40. In a preferred embodiment rigid collar measuring system 38 has five sensors 40. Preferably rigid collar measuring system 38 has "n" sensors with n≧3 and the "n" sensors separated by a fixed angular distance Øn with Øn≧90°/(n−1), more preferably Øn≧120°/(n−1). In a preferred embodiment angular distance spacing is in the range of 60-120 degrees, preferably 70-120, more preferably 80-120. In a preferred embodiment the angular distance spacing is about 80 (80±10) degrees. In a preferred embodiment the angular distance spacing is about 90 (90±10) degrees. In a preferred embodiment the angular distance spacing is about 120 degrees.

In an embodiment the invention includes a method of monitoring a vehicular propulsion system. The method includes monitoring a vehicular propulsion system 22 having a drive shaft flexible coupling 30. The method includes providing a vehicular propulsion system drive shaft flexible coupling 30 with a first coupling hub member 32 with an electromagnetic sensor target and a second coupling hub member 34 with an electromagnetic sensor target and providing a flexible coupling sensor rigid annular collar measurement system 38 with a first electromagnetic sensor 40, a second electromagnetic sensor 40, and a third electromagnetic sensor 40. The method includes encompassing the first coupling hub member sensor target 36 and the second coupling hub member sensor target 36 with the flexible coupling sensor rigid annular collar measurement system 38 while inhibiting a physical contact between the flexible coupling sensor rigid annular collar measurement system and the vehicular propulsion system drive shaft flexible coupling with the first sensor 40, the second sensor 40, and the third sensor 40 angularly spaced around the flexible coupling 30. The method includes noncontactingly measuring multiple positional characteristics of the first coupling hub member 32 and the second coupling hub member 34 to monitor performance of the vehicular propulsion system drive shaft flexible coupling that relates to the transfer of motive power through the vehicular propulsion system drive shaft flexible coupling 30. Sensors 40 are rigidly fixed around the collar of rigid annular collar measurement system 38 with first sensor 40 fixed a first fixed angular distance from second sensor 40 and the third sensor 40 fixed a second fixed angular distance from the second sensor 40. Preferably the first, second, and third sensors 40 are equally spaced apart with the first fixed angular distance equal to the second fixed angular distance. In a preferred embodiment the fixed angular distances spacing of sensors 40 is in the range of 60° to 120°. Preferably, sensor rigid collar measuring system 38 has at least three sensors 40. In a preferred embodiment system 38 has four sensors 40. In a preferred embodiment rigid collar measuring system 38 has five sensors 40. Preferably rigid collar measuring system 38 has "n" sensors with n≧3 and the "n" sensors separated by a fixed angular distance Øn with Øn≧90°/(n−1), more preferably Øn≧120°/(n−1). In a preferred embodiment angular distance spacing is in the range of 60-120 degrees, preferably 70-120, more preferably 80-120. In a preferred embodiment the angular distance spacing is about 80 (80±10) degrees. In a preferred embodiment the angular distance spacing is about 90 (90±10) degrees. In a preferred embodiment the angular distance spacing is about 120 degrees. In an embodiment the first coupling hub member and the second coupling hub member are magnetic. In an embodiment the first coupling hub member and the second coupling hub member are ferrous. In an embodiment the electromagnetic sensor targets are ferrous target rings attached to the coupling hub members. In an embodiment the electromagnetic sensor targets are magnetic target rings attached to the coupling hub members. Preferably the first coupling hub member 32 has an outer circumference perimeter and the first coupling hub member sensor target 36 is a magnetic ring proximate the first coupling hub member outer circumference perimeter, the second coupling hub member 34 has an outer circumference perimeter and the second coupling hub member sensor target is a magnetic ring proximate the second coupling hub member outer circumference perimeter, with the first, second, and third sensors 40 comprising magnetostrictive sensors that extend over the first coupling hub member magnetic ring sensor target and the second coupling hub member magnetic ring sensor target, and noncontactingly measuring includes magnetostrictively sensing distances from the first coupling hub member magnetic ring target to the second coupling hub member magnetic ring target. Noncontactingly measuring preferably includes magnetostrictively measuring the position of the first coupling hub member sensor target and the second coupling hub member sensor target, preferably with the first magnetostrictive sensor, the second magnetostrictive sensor, and the third magnetostrictive sensor fixed in parallel longitudinal alignment. Preferably the first coupling hub member defines a plane and the second coupling hub member defines a plane, and noncontactingly measuring includes magnetostrictively measuring a plurality of distances from the first coupling hub member to the second coupling hub member to provide a misalignment angle $\theta_{misalignment}$ between the first coupling hub member plane and the second coupling hub member plane. In a preferred embodiment of the method the sensors are magnetostrictive sensors fixed in parallel alignment with the second magnetostrictive sensor and the third magnetostrictive sensor fixed in parallel alignment, and measuring the rotating shaft coupling includes magnetostrictively measuring a plurality of distances from the first coupling hub member sensor target to the second coupling hub member sensor target, and transforming the magnetostrictively measured distances into an angular misalignment angle and an axial displacement distance between the first coupling hub and the second coupling hub member.

In an embodiment the invention includes a method of monitoring a drive shaft coupling. The method includes providing a drive shaft coupling 30 with a first coupling hub member 32 with an electromagnetic EM sensor target and a second coupling hub member 34 with an electromagnetic EM sensor target, providing a coupling sensor rigid annular collar measurement system 38 with a first electromagnetic EM sensor 40, a second sensor 40, and a third sensor 40, and encompassing the first coupling hub member sensor target and the second coupling hub member sensor target with the coupling sensor rigid collar measurement system 38 while inhibiting a physical contact between the coupling sensor rigid collar measurement system and the rotating drive shaft coupling, with the first, second, and third sensors angularly spaced externally around the coupling. The method includes noncontactingly electromagnetically measuring a plurality of positional characteristics of the first coupling hub member and the second coupling hub member to monitor a performance of the drive shaft coupling which relates to the transfer of motive power through the drive shaft coupling. Sensors 40 are rigidly fixed around the collar of rigid annular collar measurement system 38 with first sensor 40 fixed a first fixed angular distance from second sensor 40 and the third sensor 40 fixed a second fixed angular distance from the second sensor 40. Preferably the first, second, and third sensors 40 are equally spaced apart with the first fixed angular distance equal to the second fixed angular distance. In a preferred embodiment the fixed angular distances spacing of sensors 40 is in the range of 60° to 120°. Preferably, sensor rigid collar measuring system 38 has at least three sensors 40. In a preferred embodiment system 38 has four sensors 40. In a preferred embodiment rigid collar measuring system 38 has five sensors 40. Preferably rigid collar measuring system 38 has "n" sensors with $n \geq 3$ and the "n" sensors separated by a fixed angular distance $\emptyset n$ with $\emptyset n \geq 90°/(n-1)$, more preferably $\emptyset n \geq 120°/(n-1)$. In a preferred embodiment angular distance spacing is in the range of 60-120 degrees, preferably 70-120, more preferably 80-120. In a preferred embodiment the angular distance spacing is about 80 (80±10) degrees. In a preferred embodiment the angular distance spacing is about 90 (90±10) degrees. In a preferred embodiment the angular distance spacing is about 120 degrees. In an embodiment the first coupling hub member and the second coupling hub member are magnetic. In an embodiment the first coupling hub member and the second coupling hub member are ferrous. In an embodiment the electromagnetic (EM) sensor targets are ferrous target rings attached to the coupling hub members. In an embodiment the electromagnetic (EM) sensor targets are magnetic target rings attached to the coupling hub members. Preferably the first coupling hub member 32 has an outer circumference perimeter and the first coupling hub member sensor target 36 is a magnetic ring proximate the first coupling hub member outer circumference perimeter, the second coupling hub member 34 has an outer circumference perimeter and the second coupling hub member sensor target is a magnetic ring proximate the second coupling hub member outer circumference perimeter, with the first, second, and third magnetostrictive sensors 40 extending over the first coupling hub member magnetic ring sensor target and the second coupling hub member magnetic ring sensor target, and noncontactingly measuring includes magnetostrictively sensing distances from the first coupling hub member magnetic ring target to the second coupling hub member magnetic ring target. Noncontactingly measuring preferably includes magnetostrictively measuring the position of the first coupling hub member sensor target and the second coupling hub member sensor target, preferably with the first magnetostrictive sensor, the second magnetostrictive sensor, and the third magnetostrictive sensor fixed in parallel longitudinal alignment. Preferably the first coupling hub member defines a plane and the second coupling hub member defines a plane, and noncontactingly measuring includes magnetostrictively measuring a plurality of distances from the first coupling hub member to the second coupling hub member to provide a misalignment angle $\theta_{misalignment}$ between the first coupling hub member plane and the second coupling hub member plane. Preferably the method includes measuring a plurality of distances from the first coupling hub member to the second coupling hub member with the sensors and transforming the plurality of measured distances into an angular misalignment angle and an axial displacement distance between the rotating shaft coupling hub members.

In an embodiment the invention includes a method of monitoring a flexible coupling drive shaft system with rotating members. The method includes providing a drive shaft coupling system with a first rotating member 32 with an electromagnetic EM sensor target and a second rotating member 34 with a electromagnetic EM sensor target, providing a sensor rigid collar measurement system 38 with a first electromagnetic EM sensor 40, a second sensor 40, and a third sensor 40, encompassing the first rotating member sensor target and the second rotating member sensor target with the sensor rigid collar measurement system while inhibiting a physical contact between the sensor rigid collar measurement system and the rotating members, with the first, second, and the third sensors angularly spaced around the first rotating member and the second rotating member, and noncontactingly measuring a plurality of rotating positional characteristics of the first rotating member 32 and the second rotating member 34 to monitor a performance of the drive shaft system which relates to a transfer of motive power through the drive shaft system, and then providing for a correction change in the drive shaft system when a measured rotating positional characteristic performance of the drive shaft system exceeds a measured rotating positional characteristic performance limitation. When the sensor rigid collar measurement system 38 measures a rotating positional characteristic performance exceeding a performance limitation then proper corrective action is initiated. In an embodiment, when the sensor rigid collar measurement system 38 measures a rotating positional characteristic performance of coupling 30 with the misalignment angle $\theta_{misalignment}$ between the first rotating coupling hub member and the second rotating coupling hub member exceeding a misalignment angle limitation, use of the flexible coupling 30 in the drive shaft propulsion system 22 is limited until the coupling 30 is replaced or other corrective action is taken to correct the exceeding of the misalignment angle performance limitation. The flexible coupling drive shaft monitoring system and method provides for a correction in the drive shaft system, correction or replacement of a system element, and checking the drive shaft system for operational problems.

In an embodiment the invention includes a method of monitoring a drive shaft system. The method includes providing a drive shaft system 28 with a first rotating member 32 with a magnetic sensor target 36 and providing a sensor rigid measurement system 38 with a magnetostrictive sensor 40 proximate the first rotating member sensor target 36 while inhibiting a physical contact between the measurement system magnetostrictive sensor 40 and the rotating member 32, magnetostrictively measuring a rotating positional characteristic of the first rotating member 32 to monitor a performance of the drive shaft system 28. The method includes providing a shaft system with at least a first rotating member with a magnetic sensor target, providing a sensor rigid measurement system with at least a first magnetostrictive sensor proximate to and external from the first rotating member sensor target while inhibiting a physical contact between the measurement system magnetostrictive sensor and the rotating member, and magnetostrictively measuring a dynamic rotating positional characteristic of the rotating member to dynamically monitor a performance of the rotating shaft system.

In an embodiment the invention includes a method of measuring a rotating shaft. The method includes providing a shaft with a first rotating member with a magnetic sensor target and providing a sensor measurement system with a magnetostrictive sensor proximate the first rotating member sensor target while inhibiting a physical contact between the measurement system magnetostrictive sensor and the rotating member, and magnetostrictively measuring a rotating positional characteristic of the first rotating member to dynamically measure the rotating shaft. Preferably the method includes measuring a plurality of distances along the shaft that relate to the sensed magnetic sensor target rotating member and transforming the plurality of measured distances to provide an angular misalignment angle for the rotating shaft. Preferably the method includes measuring a plurality of distances along the shaft that relate to the sensed magnetic sensor target rotating member and transforming the plurality of measured distances to provide an axial displacement distance for the rotating shaft. The invention includes a dynamic method of measuring a rotating shaft. The method includes providing a shaft with a first rotating member with a sensor target and a second rotating member with a sensor target, preferably with the sensor targets magnetic. Preferably the rotating member sensor targets are disks, preferably magnetic sensor target disks. The method includes providing a sensor measurement system with at least a first sensor proximate the first rotating member sensor target and the second rotating member sensor target, and measuring a plurality of distances from the first rotating member sensor target to the second rotating member sensor target and transforming these measured distances into a dynamic rotating positional characteristic of the rotating shaft. Preferably the at least first sensor proximate the first rotating member sensor target and the second rotating member sensor target is a magnetostrictive sensor, preferably with the at least first magnetostrictive sensor external from the magnetic sensor target. Preferably transforming the plurality of measured distances into a dynamic rotating positional characteristic of the rotating shaft includes transforming the plurality of measured distances into an axial displacement distance of the rotating shaft. Preferably transforming the plurality of measured distances into a dynamic rotating positional characteristic of the rotating shaft includes transforming the plurality of measured distances into an angular misalignment angle of the rotating shaft. Preferably measuring the plurality of distances from the first rotating member sensor target to the second rotating member sensor target includes magnetically detecting the first rotating member sensor target and the second rotating member sensor target. Preferably measuring the plurality of distances from the first rotating member sensor target to the second rotating member sensor target includes magnetostrictively sensing the targets, preferably with a plurality of magnetostrictive sensors positioned proximate and external from the first rotating member sensor target and the second rotating member sensor target.

In an embodiment the invention includes a rotating shaft measurement system for noncontactingly monitoring a rotating member 32 including a magnetic sensor target 36, with the rotating shaft measurement system including a sensor rigid collar 38 comprised of a first magnetostrictive sensor 40. The first magnetostrictive sensor 40 is rigidly fixed on the sensor rigid collar proximate the rotating member 32, wherein the sensor rigid collar measurement system first magnetostrictive sensor 40 noncontactingly magnetostrictively monitors a position of the rotating member sensor target 36 to provide a measurement of a rotating positional characteristic of the first rotating member 32 to monitor a performance of the rotating member.

In an embodiment the invention includes a shaft coupling measurement system for noncontactingly monitoring a flexible coupling. The shaft coupling measurement system 38 is for measurement of a flexible coupling 30 with a first coupling hub member 32 including an magnetic target and a second coupling hub member 34 including an magnetic target, with the first coupling hub member flexibly coupled to the second coupling hub member. The flexible coupling sensor rigid collar misalignment measuring system 38 encompasses the flexible coupling 30 with a first EM magnetostrictive sensor 40, a second EM magnetostrictive sensor 40, and a third EM magnetostrictive sensor 40 rigidly fixed around the system collar, with the first sensor 40 fixed a first fixed angular distance from the second sensor 40, and the third sensor 40 fixed a second fixed angular distance from the second sensor 40. The flexible coupling sensor rigid collar misalignment measuring system magnetostrictive sensors 40 noncontactingly monitor a position of the first coupling hub member 32 relative to a position of the second coupling hub member 34 to provide a misalignment measurement of the flexible coupling which relates to a performance of the coupling 30. The first coupling hub member 32 has an outer circumference perimeter and the first coupling hub member target is a magnetic ring proximate the first coupling hub member outer circumference perimeter, and the second coupling hub member 34 has an outer circumference perimeter and the second coupling hub member target is a magnetic ring proximate the second coupling hub member outer circumference perimeter. The first magnetostrictive sensor 40 extends over the first coupling hub member magnetic ring and the second coupling hub member magnetic ring, the second magnetostrictive sensor 40 extends over the first coupling hub member magnetic ring and the second coupling hub member magnetic ring, and the third magnetostrictive sensor 40 extends over the first coupling hub member magnetic ring and the second coupling hub member magnetic ring. The first magnetostrictive sensor 40 is fixed in parallel alignment with the second magnetostrictive sensor 40 and the third magnetostrictive sensor 40. Preferably the first coupling hub member 32 defines a plane and the second coupling hub member 34 defines a plane with the flexible coupling sensor rigid collar misalignment measuring system 38 noncontactingly measuring a plurality of positional distances of the first coupling hub member magnetic ring and the second coupling hub member magnetic ring along the longitudinal length of the magnetostrictive sensors 40 to provide a misalignment angle $\theta_{misalignment}$ between the first coupling hub member plane and the second coupling hub member plane. The flexible coupling sensor rigid collar misalignment measuring system provides for measurement of the position of the first target relative to the sensors and for measurement of the position of the second target relative to the sensors. The flexible coupling sensor rigid collar misalignment measuring system can provide for an absolute measurement of the target positions and for the relative measurement of the target positions. The flexible coupling sensor rigid collar misalignment measuring system 38 encompassing the flexible coupling 30 is physically separated from the flexible coupling with physical mechanical contact between the flexible coupling sensor rigid collar misalignment measuring system and the flexible coupling inhibited. Preferably the flexible coupling 30 couples a first drive shaft 28 to a second drive 28 with the magnetostrictive sensor fingers 40 fixed on an annular support members with the sensors 40 in parallel alignment with the drive shafts when the misalignment angle of the drive shafts is zero and in substantially parallel alignment with the drive shafts when the misalignment angle of the drive shafts is not zero. In an embodiment flexible coupling sensor rigid collar 38 is a continuous uninterrupted ring with sensors 40 at 120 degree fixed angular distances. In an embodiment flexible coupling sensor rigid collar 38 is an interrupted ring, such as a horseshoe arc cradle.

Preferably coupling sensor rigid collar misalignment measuring system 38 includes at least three magnetostrictive linear sensors 40. Magnetostrictive sensors 40 are used to measure the axial displacement of coupling 30 and the target locations of coupling hub members 32, 34 of shaft coupling 30. With coupling sensor rigid collar measuring system 38, axial motion is measured at three locations around the outside of the magnetic ring target 36 placed on each side of the coupling 30. Each set of three positions is used to determine a plane normal to the axis of rotation on each side. This is used to determine the angular alignment each coupling 30 is exposed to. Magnetostrictive sensors 40 measure multiple magnetic targets 36 along the axis of the sensor 40. The three magnetostrictive sensors 40 are used to determine the 6 points needed to calculate this angular alignment. In the magnetostrictive position sensor 40, a pulse is induced in the magnetostrictive waveguide sensor body by the momentary interaction of two magnetic fields. One field comes from the rotating member movable magnet target 36 which passes along the outside of the magnetostrictive sensor tube, and the other field comes from a current interrogation pulse launched along the waveguide sensor body. The interaction between the two magnetic fields produces a strain pulse, which travels at sonic speed along the waveguide until the pulse is detected at the head of the sensor. The position of the magnetic target 36 is precisely determined by measuring the elapsed time between the launching of the electronic interrogation pulse and the arrival of the strain pulse to provide accurate non-contact position sensing of coupling hub members 32, 34 of shaft coupling 30 while inhibiting contact between the sensor components 40 of coupling sensor rigid collar measuring system 38 and rotating shaft coupling 30.

The coupling sensor rigid collar measuring system assembly includes three or more magnetostrictive sensors 40 mounted around two magnetic rings 44 which are assembled on each side of a flexible coupling 30. Each sensor 40 measures the distance from the sensor base to each magnetic ring. Each sensor is fixed to collar support members of sensor rigid collar misalignment measuring system 38. As shown in FIG. 3, the coupling hub members 32, 34 are fixed to the ends of shaft members 28.

Figure 5:
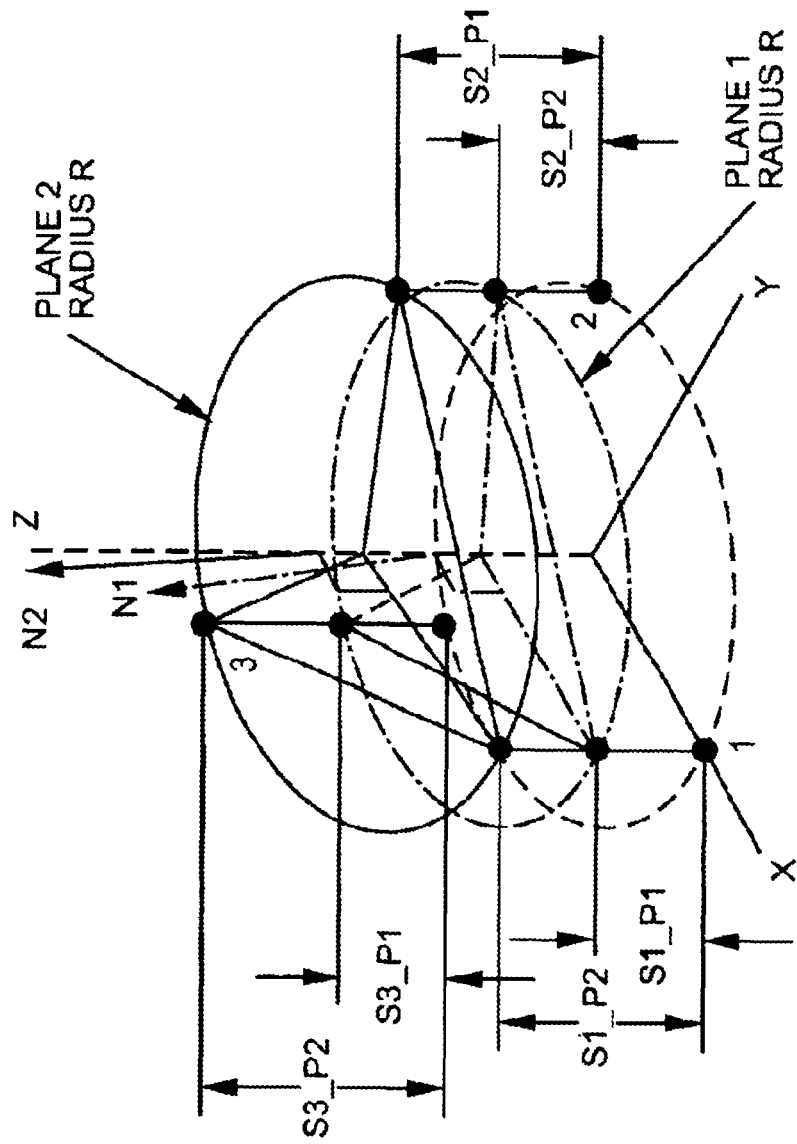
FIG. 5 illustrates a sensor measurement system and method.
Figure 6C:
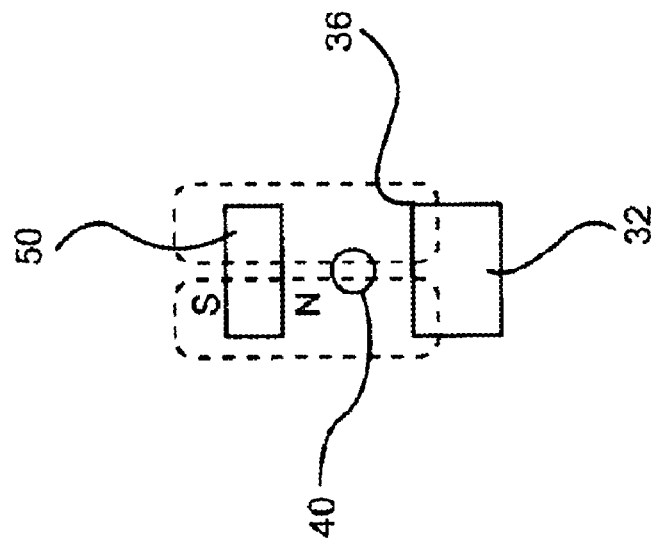
Figure 6B:
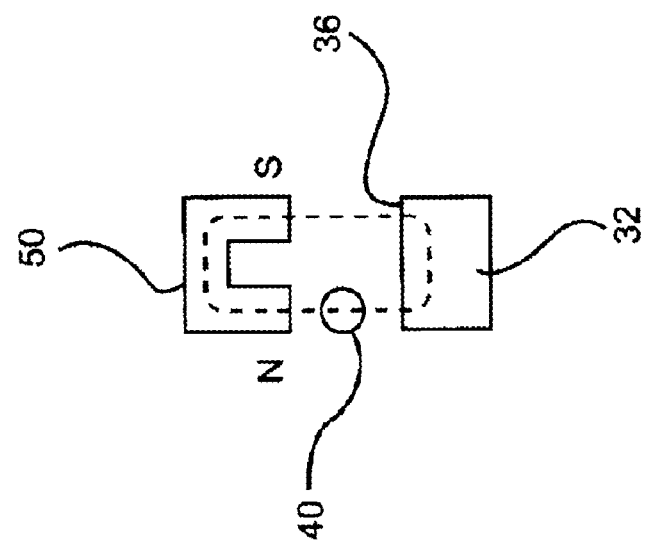
Figure 6D:
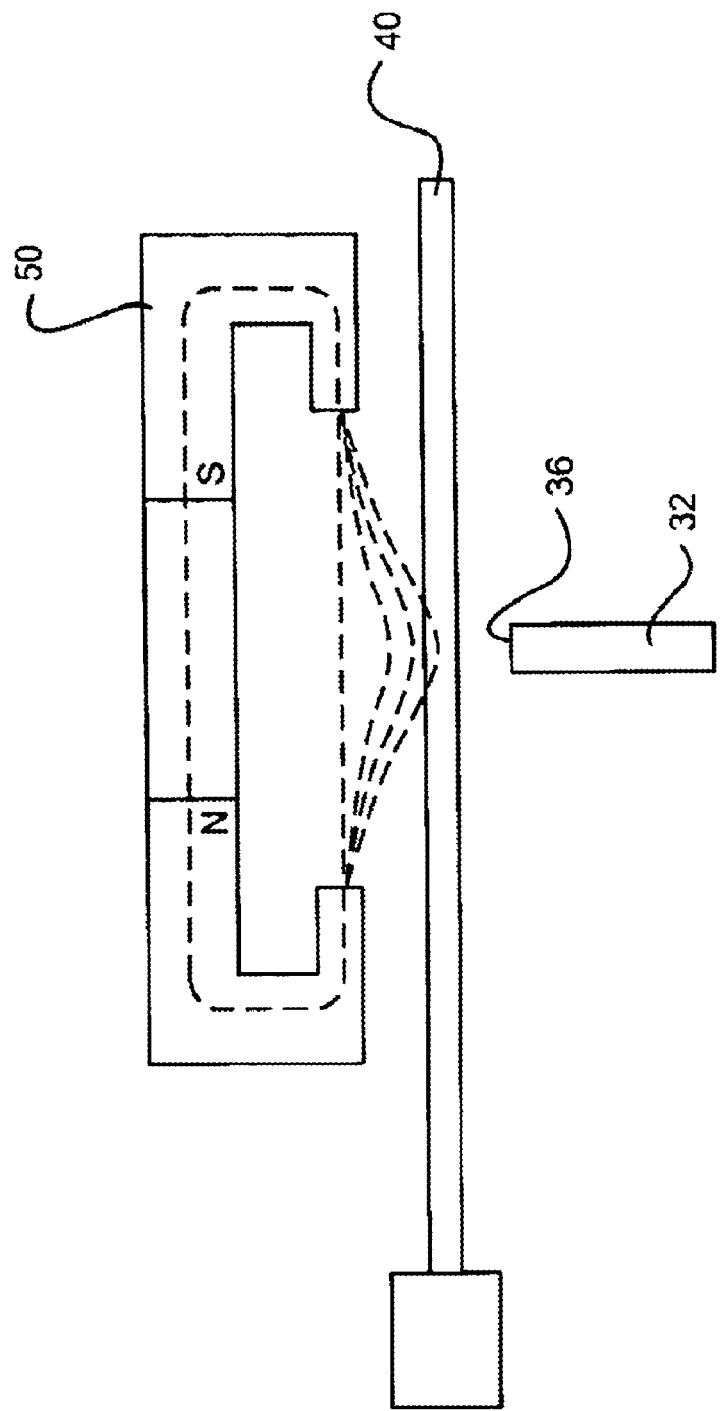

To determine the angular misalignment in-between the two shafts members 28, the three sensors 40 are fixed to each other in a known reference plane. The three sensors define a plane, with the sensors fixed between the rigid collar arched frame of coupling sensor rigid collar misalignment measurement system 38 and thereby define an arbitrary plane. From this arbitrary plane, the plane of each side of the coupling 30 can be determined using the magnetic field produced by the hub member sensor target magnets 44. The arbitrary and coupling planes are then subtracted to determine the degree of misalignment of the shaft members 28. The following derivation utilizing the system illustrated in FIG. 5 shows the angular misalignment calculation from an arbitrary reference plane.

Define Points on the First Plane

Plane 1, point 1=(R,0,S1_P1)

Plane 1, point 2=(R*cos(120),R*sin(120),S2_P1)

Plane 1, point 3=(R*cos(120), R*sin(120),S3_P1)

Define Points on the Second Plane

Plane 2, point 1=(R,0,S1_P2)

Plane 2, point 2=(R*cos(120),R*sin(120),S2_P2)

Plane 2, point 3=(R*cos(120), R*sin(120),S3_P2)

Define Two Lines on Plane 1

L_P1_12=(R*cos(120)−R,R*sin(120),S2_P1−S1_P1)

L_P1_13=(R*cos(240)−R,R*sin(240),S3_P1−S1_P1)

Define Two Lines on Plane 2

L_P2_12=(R*cos(120)−R,R*sin(120),S2_P2−S1_P2)

L_P2_13=(R*cos(240)−R,R*sin(240),S3_P2−S1_P2)

Define Normal Vectors

N1=(L_P1_12×L_P1_13)

N2=(L_P2_12×L_P2_13)

Let $\theta_{misalignment}$ be the Misalignment angle between the two planes $$\cos(\theta_{misalignment}) = \frac{N1 \cdot N2}{\|N1\| * \|N2\|}$$

The $\theta_{misalignment}$ is solvable regardless what the angle of each disk to each of the axis plane of the sensor bracket.

FIG. 2 shows the magnetostrictive misalignment system 38 on a drive shaft 28. The shaft 28 has a flexible coupling 30 at each end, where it is desired to measure the misalignment seen by each coupling. The coupling sensor rigid collar misalignment measuring system collar 38 with a plurality of sensor fingers spaced equally around the collar enshrouds the opposed shaft ends. The magnetostrictive sensors 40 preferably are embedded in the collar frame structure fingers which extend proximate the coupling members 32, 34. The wiring and electronics for coupling sensor rigid collar misalignment measuring system are preferably integrated into the bracket. Additionally, the sensors preferably include sensing means suitable to locate the sensing means along the periphery of and proximate the coupling member.

FIG. 2 shows an integrated sensor bracket system installed around a coupling 30. This bracket incorporates three magnetostrictive sensors 40 into a collar bracket which is installed over the shaft. The magnetic rings are located radially inwardly of the sensor fingers of misalignment system 38. These rotating member rings are made of magnetic material in a continuous pole configuration such that the magnetic fields produced by the rings are sensed by the magnetostrictive sensors 40 of the integrated sensor bracket system. The sensor electronics can be integrated into the bracket housing and provide a single assembly.

The center of each plane can be determined to calculate the axial distance between each plane. This information is useful in determining if the rotating shaft system coupling is affected by issues of thermal growth.

Figure 7B:
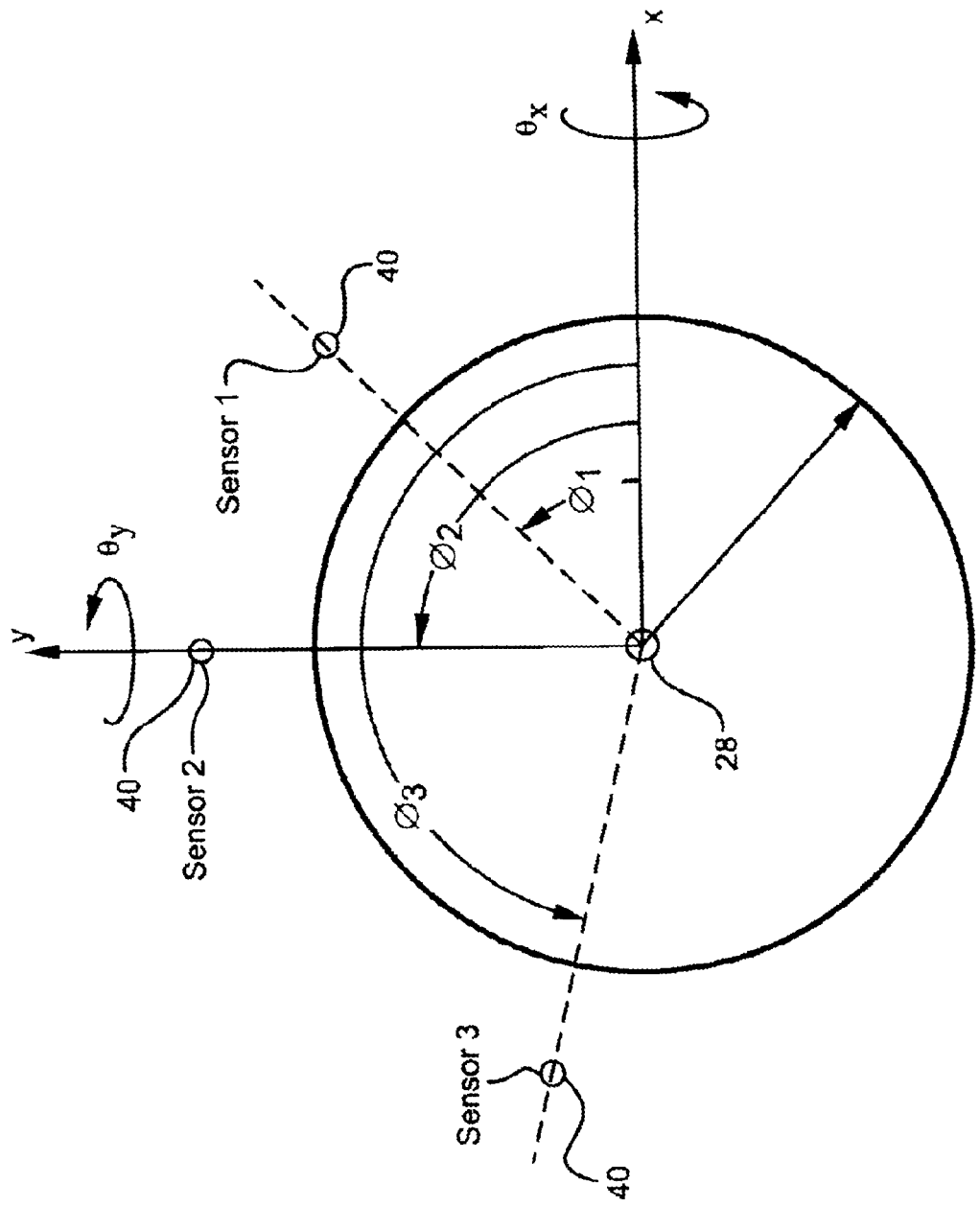
Figure 7C:
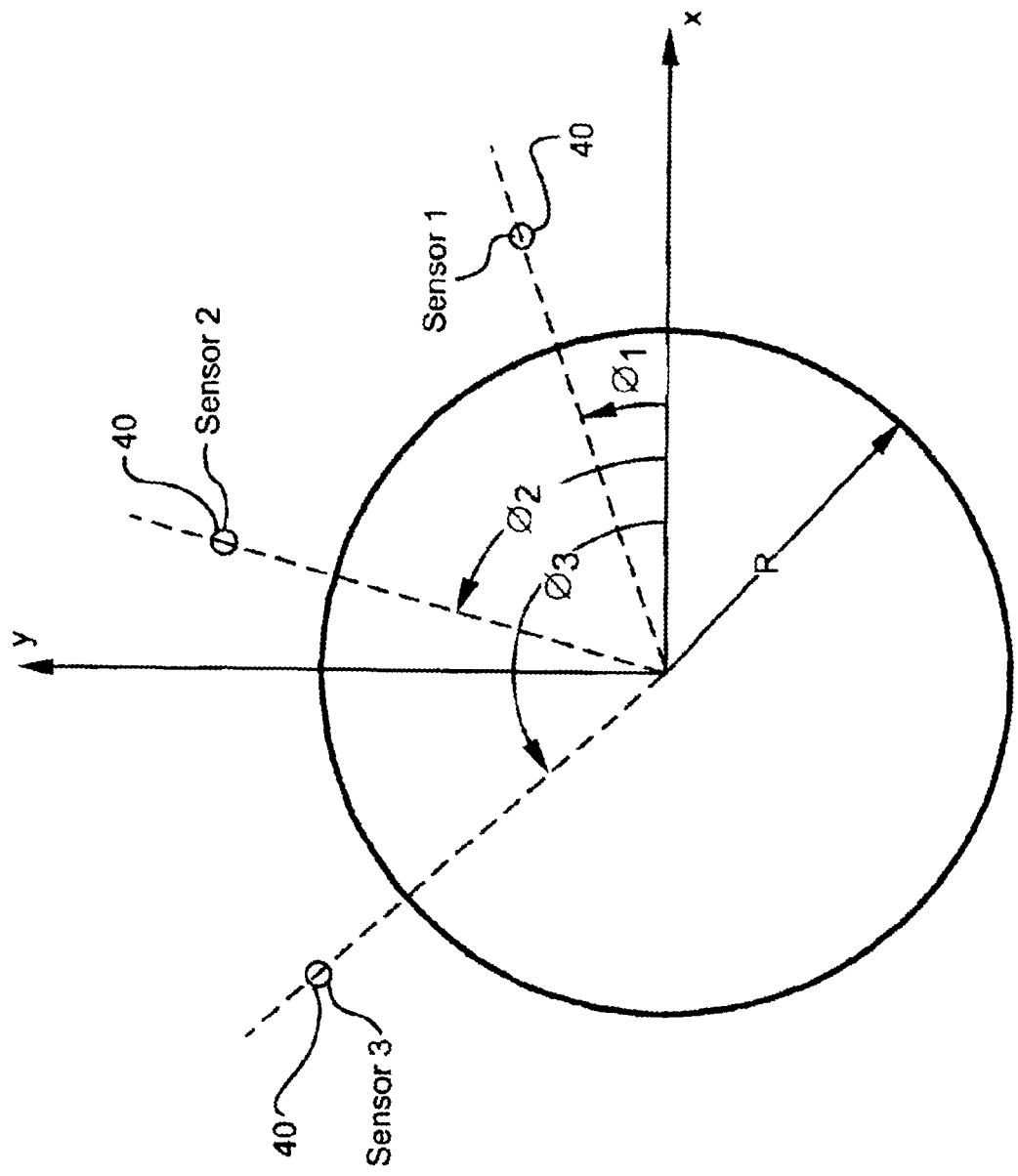

In an embodiment the invention includes a method of measuring a rotating shaft system. The method can be used to dynamically measure a rotating shaft system with a coupling or without a coupling. The method includes dynamically sensing a plurality of positional distances to provide three measured distances between two sensor targets spaced along the length of the rotating shaft, with the three measured distances angularly separated. The three measured distances are transformed into angular misalignment of the rotating shaft and axial displacement (distance) of the rotating shaft. The method includes providing a shaft 28 with a first rotating member 32 with a sensor target disk 1 and a second rotating member 34 with a sensor target disk 2. As shown in FIG. 7, rotating shaft 28 has a mean distance $d_o$ between the centers of rotating member sensor disk target 32 (center of disk-1 having a radius R) and rotating member sensor disk target 34 (center of disk-2 having a radius R). Three measured distances $d_1$, $d_2$, $d_3$ between the circumference perimeter of the disks are obtained from three angularly separated sensors 40 (sensor #1, sensor #2, sensor #3) (angular location of the sensors shown in FIG. 7B-7C). The misalignment of the rotating shaft 28 is calculated in the method with the assumption that disk-1 is always perpendicular to the coordinate frame (X Y Z), that disk-2 rotates with respect to XYZ by an amount of $\theta_x$, $\theta_y$, and disk-2 is separated from disk-1 by distance $d_o$ at the shaft. The three measured distances $d_1$, $d_2$, $d_3$ obtained from the sensors 40 are transformed with the following geometric equations and matrix transforms:

$$d_1 = d_o + R\cos(\phi_1)\theta_y + R\sin(\phi_1)\theta_x$$
$$d_2 = d_o + R\cos(\phi_2)\theta_y + R\sin(\phi_2)\theta_x$$
$$d_3 = d_o + R\cos(\phi_3)\theta_y + R\sin(\phi_3)\theta_x$$

$$\begin{Bmatrix} d_1 \\ d_2 \\ d_3 \end{Bmatrix} = \begin{bmatrix} 1 & R\cos(\phi_1) & R\sin(\phi_1) \\ 1 & R\cos(\phi_2) & R\sin(\phi_1) \\ 1 & R\cos(\phi_3) & R\sin(\phi_1) \end{bmatrix} \begin{Bmatrix} d_o \\ \theta_y \\ \theta_x \end{Bmatrix}$$

$$A = \begin{bmatrix} 1 & R\cos(\phi_1) & R\sin(\phi_1) \\ 1 & R\cos(\phi_2) & R\sin(\phi_1) \\ 1 & R\cos(\phi_3) & R\sin(\phi_1) \end{bmatrix}$$

$$\begin{Bmatrix} d_o \\ \theta_y \\ \theta_x \end{Bmatrix} = A^{-1} \begin{Bmatrix} d_1 \\ d_2 \\ d_3 \end{Bmatrix}$$

$$\theta = \sqrt{\theta_x^2 + \theta_y^2}$$

Figure 8:
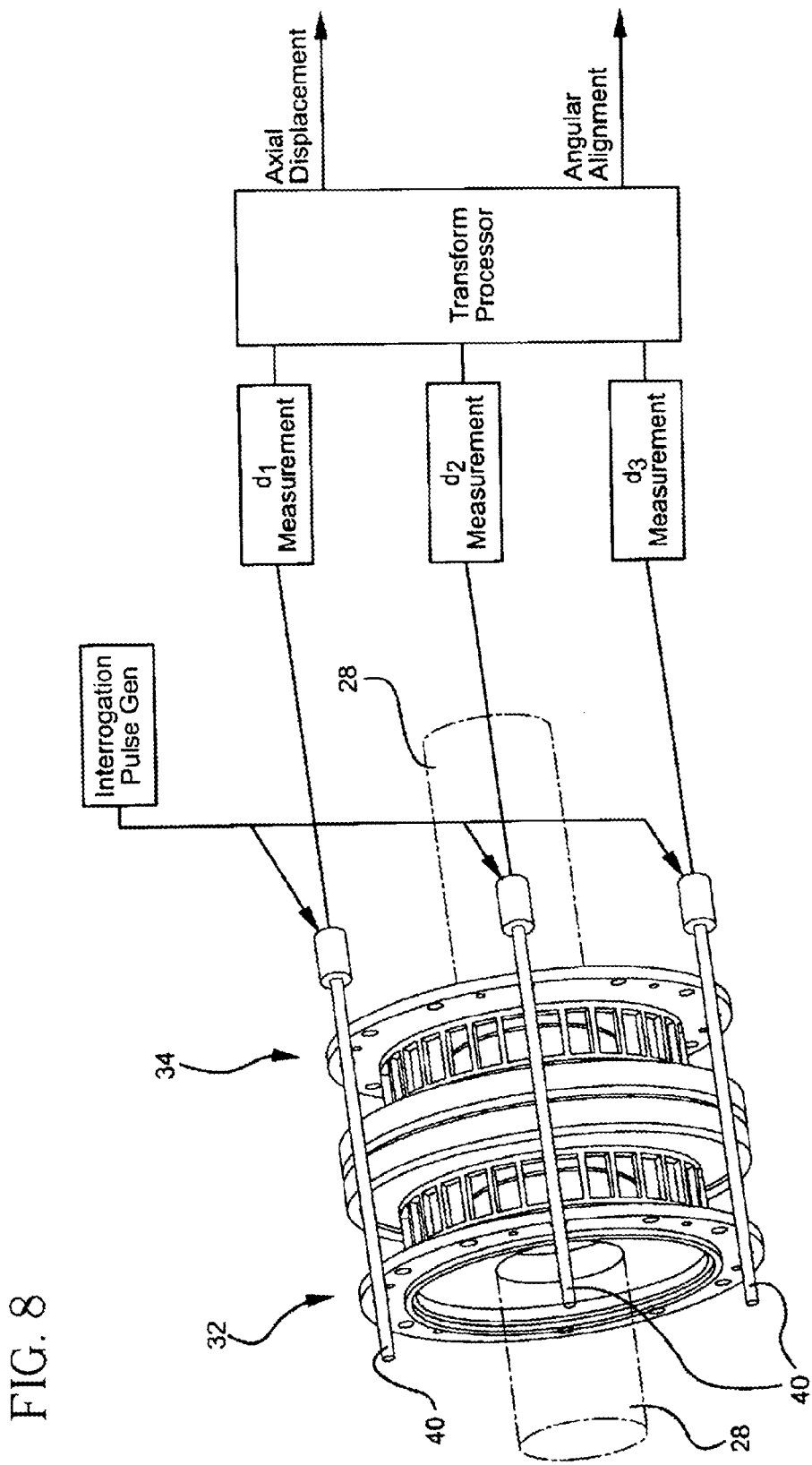
FIG. 8 shows a sensor measurement system.
Figure 9:
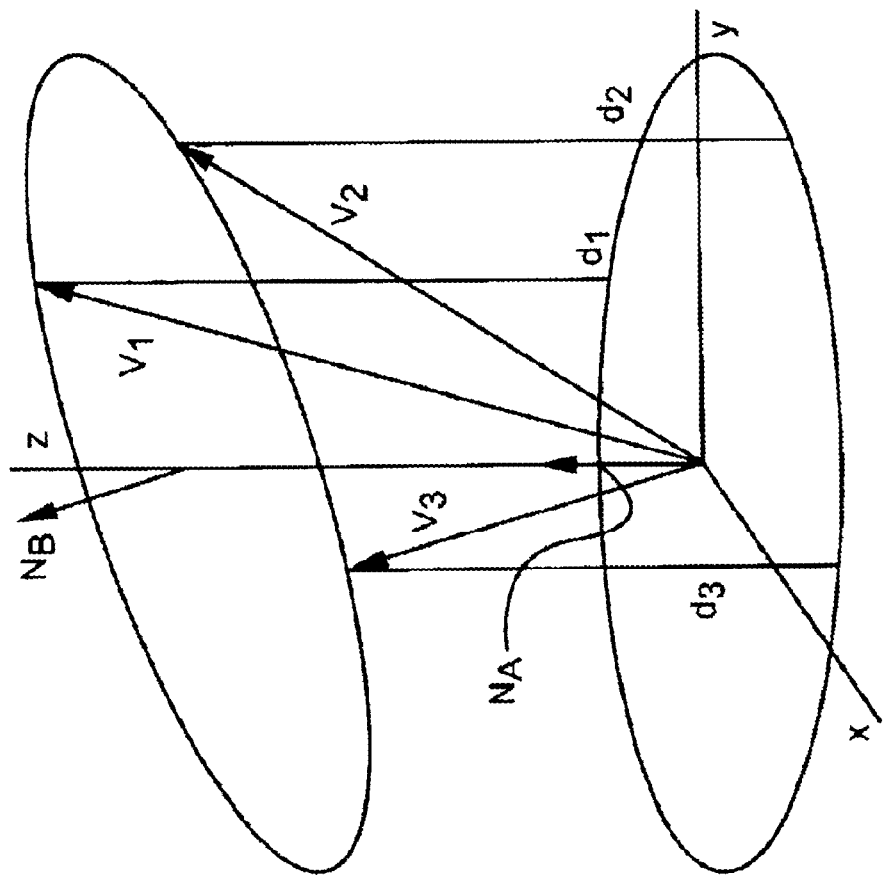
FIG. 9 shows a sensor measurement system.
Figure 10:
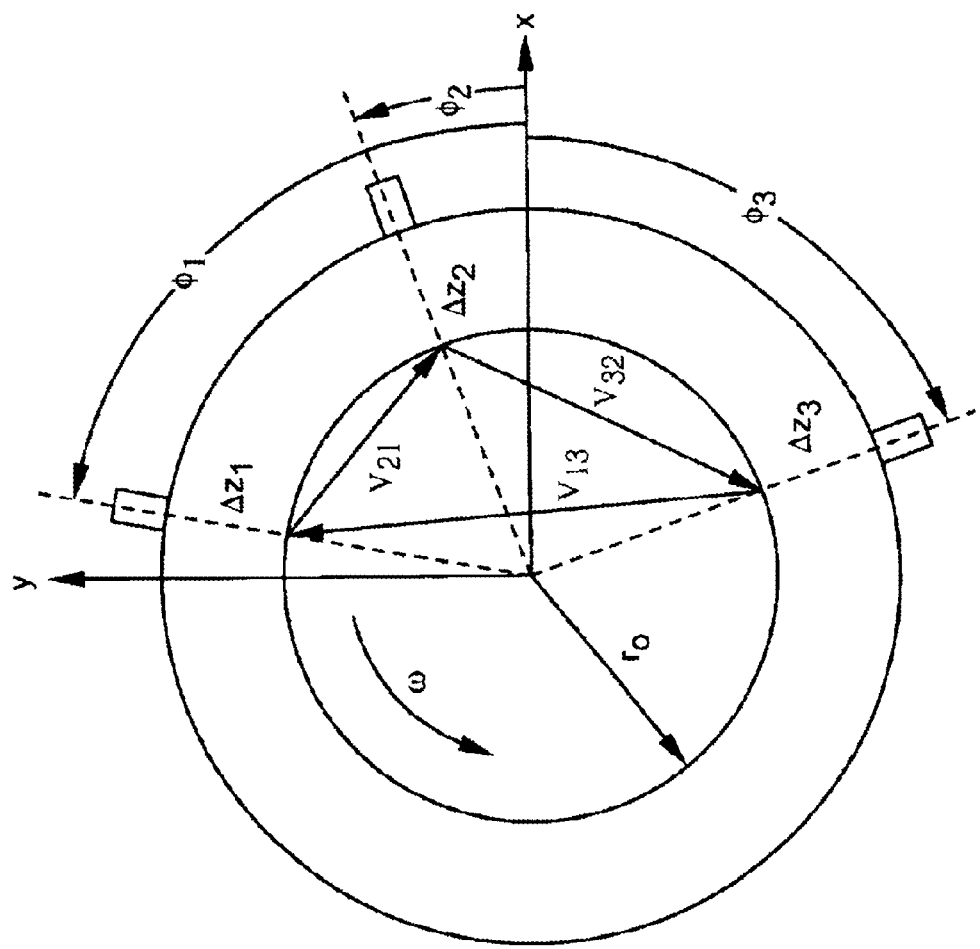
FIG. 10 shows a sensor measurement system.

Using the A matrix, the three measured distances are transformed to provide the angular misalignment of the rotating shaft and axial displacement distance of the rotating shaft between the rotating members 32, 34. FIG. 8 shows another embodiment with three angularly separated sensors 40 fixed around the rotating shaft's first rotating member 32 sensor target disk and the second rotating member 34 sensor target disk providing three measured distances $d_1$, $d_2$, $d_3$ which are transformed to provide the axial displacement and angular alignment of rotating coupling 30 or rotating shaft 28. As shown in FIG. 9-10 misalignment is computed by measuring the relative displacements $\{d_1, d_2, d_3\}$ between the two disks at three points around the perimeter. These displacements are measured by timing the interval between the target disks, and multiplying this result by the wave speed:

$$d_n(\text{in}) = c\left(\frac{\text{in}}{\text{sec}}\right) \times \Delta t(\text{sec}) \quad (1)$$

where n={1, 2, 3} is the sensor number, and c is a known wave speed (for magnetostrictive sensors 40 the known sonic speed of the magnetically induced strain pulse wave in the magnetostrictive sensor waveguide body). For this analysis, it is convenient to assume that one disk is always oriented perfectly in the x-y plane and the other disk is at some angle relative to the x-y plane as shown in FIG. 9 (Vector diagram for locating points on a target disk). The three points at the perimeter of a target disk are represented by vectors in the absolute x-y-z coordinate system. For a general disk, as shown in FIG. 9 these vectors are given by:

$$V_1 = [\Delta x_{AB} + r_0 \cos \phi_1]\hat{x} + [\Delta y_{AB} + r_0 \sin \phi_1]\hat{y} + [d_1]\hat{z}$$

$$V_2 = [\Delta x_{AB} + r_0 \cos \phi_2]\hat{x} + [\Delta y_{AB} + r_0 \sin \phi_2]\hat{y} + [d_2]\hat{z}$$

$$V_3 = [\Delta x_{AB} + r_0 \cos \phi_3]\hat{x} + [y_{AB} + r_0 \sin \phi_3]\hat{y} + [d_3]\hat{z} \quad (2)$$

where $r_0$ is the nominal radius of the target disk, $\hat{x}$, $\hat{y}$, and $\hat{z}$ are unit vectors in the x-, y-, and z-directions respectively, and $\Delta x_{AB}$ and $\Delta y_{AB}$ are the relative displacements between disk A and disk B in the x- and y-directions respectively. To compute the normal vector for the misaligned disk, we need two vectors residing on the disk itself. FIG. 10 (Vector diagram for computing a normal vector on a target disk) indicates that there are three possibilities available:

$$V_{21} = V_2 - V_1 = r_0[\cos \phi_2 - \cos \phi_1]\hat{x} + r_0[\sin \phi_2 - \sin \phi_1]\hat{y} + [d_2 - d_1]\hat{z}$$

$$V_{32} = V_3 - V_2 = r_0[\cos \phi_3 - \cos \phi_2]\hat{x} + r_0[\sin \phi_3 - \sin \phi_2]\hat{y} + [d_3 - d_2]\hat{z}$$

$$V_{13} = V_1 - V_3 = r_0[\cos \phi_1 - \cos \phi_3]\hat{x} + r_0[\sin \phi_1 - \sin \phi_3]\hat{y} + [d_1 - d_3]\hat{z} \quad (3)$$

The normal vectors for Disk A and B are then computed as:

$$N_A = 0\hat{x} + 0\hat{y} + 1\hat{z}$$

$$N_B = V_{32B} \times V_{21B} = V_{13B} \times V_{32B} = V_{21B} \times V_{13B} \quad (4)$$

Any of the three vector cross-products should give the same answer. Preferably the method takes full advantage of this redundancy (the three vector cross-products giving the same answer) by either averaging them or using the additional measurements to diagnose any potential problems with the system. Finally, the angular deviation $\theta_{misalignment}$ between the two normal vectors, representing the primary measure of misalignment, is computed as $$\theta_{alignment} = \cos^{-1}\left(\frac{N_A \cdot N_B}{|N_A||N_B|}\right) \quad (5)$$

Figure 11:
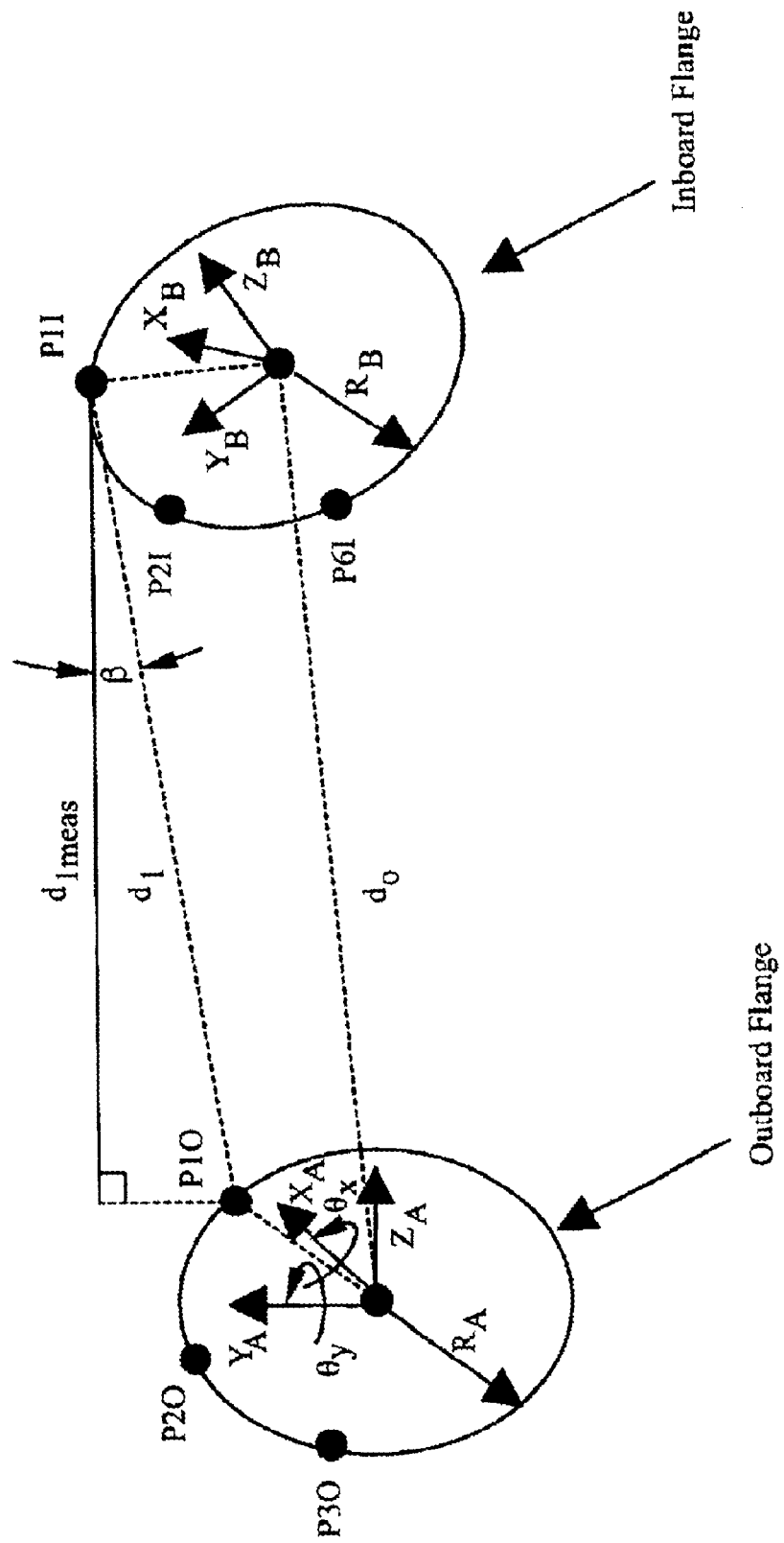
FIG. 11 shows a sensor measurement system.
Figure 12:
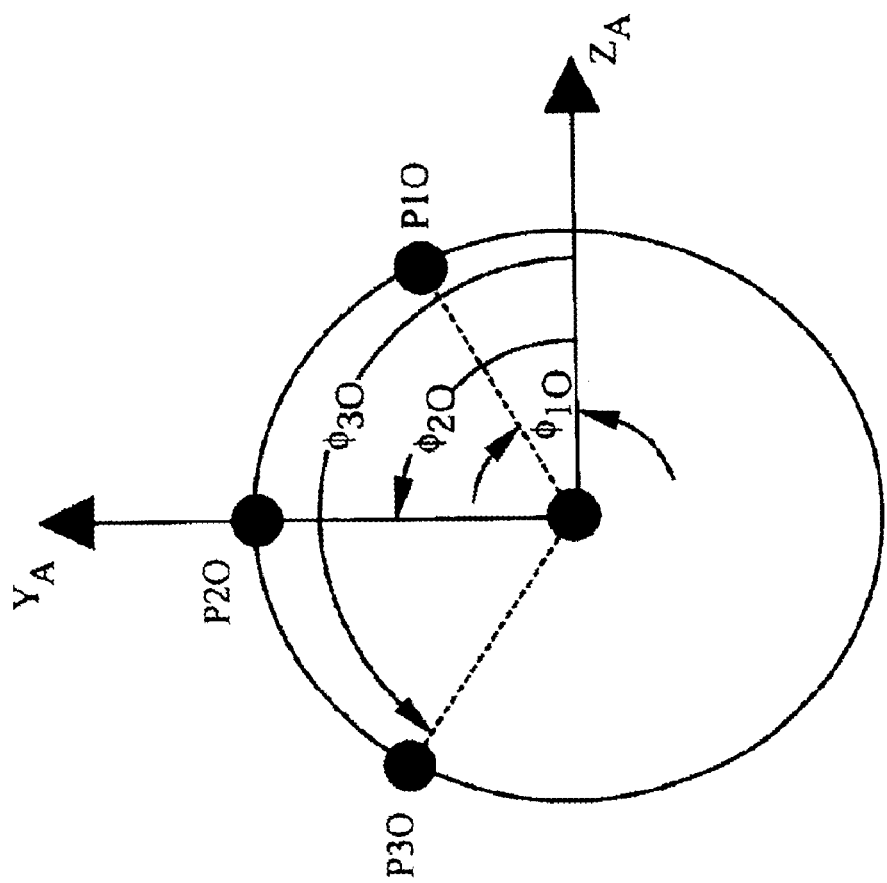
FIG. 12 shows a sensor measurement system.

FIG. 11-12 show a further method of transforming the three measured distances into the dynamic rotating positional characteristics of the rotating shaft to provide an angular misalignment and an axial displacement. The points P represent the locations on each flange (32, 34) of coupling 30 over which the three magnetostrictive sensors 40 lie. Sensor 1 lies over points P1O and P1I Sensor 2 lies over points P2O and P2I, and Sensor 3 lies over points P3O and P3I. The points are established on each flange at predetermined angles, Φ, as shown in FIG. 12. These represent the fixed angular spacing of the sensors 40 when installed in a cradle frame fixture of coupling sensor rigid collar misalignment measurement system 38. The two flanges (inboard flange and outboard flange) are free to rotate and translate and therefore have unique coordinate systems {A} and {B}. We arbitrarily select coordinate system {A} and proceed to define all points of interest in this coordinate system. Therefore, $$^A P1I = {^A_B}T \, ^B P1I = \begin{bmatrix} {^A_B}R & ^A P_{Borig} \\ 0 \ 0 \ 0 & 1 \end{bmatrix} \begin{bmatrix} ^B P1I \\ 1 \end{bmatrix} \quad \text{(Eqn. 1)}$$

in which the transformation matrix T is comprised of both rotational and translational components. The rotation matrix is represented by $$_B^A R = {_B^A}R_{xyz}(\theta_x, \theta_y, \theta_z) = R_z(\theta_z)R_y(\theta_y)R_x(\theta_x)$$

and for this case $\theta_z = 0$ so the rotation matrix becomes $$_B^A R = \begin{bmatrix} c\theta_y & 0 & s\theta_y \\ 0 & 1 & 0 \\ -s\theta_y & 0 & c\theta_y \end{bmatrix} \begin{bmatrix} 1 & 0 & 0 \\ 0 & c\theta_x & -s\theta_x \\ 0 & s\theta_x & c\theta_x \end{bmatrix}$$

$$= \begin{bmatrix} c\theta_y & s\theta_y s\theta_x & s\theta_y c\theta_x \\ 0 & c\theta_x & -s\theta_x \\ -s\theta_y & c\theta_y s\theta_x & c\theta_y c\theta_x \end{bmatrix}.$$

The point on the inboard flange can be explicitly written in the {B} coordinate system:

$$^B P1I = \begin{bmatrix} R_B c\phi_{1I} \\ R_B s\phi_{1I} \\ 0 \end{bmatrix}.$$

Similarly, $$^A P1O = \begin{bmatrix} R_A c\phi_{1O} \\ R_A s\phi_{1O} \\ 0 \end{bmatrix}.$$

We then find $d_1$ using vector math:

$$d_1 = {^A P1I} - {^A P1O}$$

Write Eqn. 1 for points P1, P2, and P3 to solve for $d_0$ (axial displacement) and $\theta_x$ and $\theta_y$. The angular misalignment is then $$\theta = \sqrt{\theta_x^2 + \theta_y^2}$$

Such transforming of a plurality of noncontactingly measured distances from a first rotating coupling hub target and a second rotating coupling hub target of shaft 28 provide for a dynamic monitoring of an angular misalignment angle and an axial displacement distance between first and second rotating target members of a rotating shaft to provide valuable rotating positional characteristics of the shaft and its performance in the rotating shaft system.

FIGS. 13-26 illustrate preferred methods of measuring the position of the target 36 along the sensor 40 with preferred methods of comparing a returned magnetostrictive pulse waveform with a template waveform. In the operation of a magnetostrictive sensor system 130 for measuring the position of target 36 an interrogation current pulse 134 is applied to the magnetostrictive waveguide 40 within the sensor with an interrogation pulse generator 132. This current establishes a toroidal magnetic field around the waveguide. This magnetic field interacts with magnetic fields generated by magnetic targets 36 and creates torsional waves within the waveguide. These torsional waves propagate back to the origination end whereby they are detected with a waveform detector 124 (preferably a sense-coil 138), producing a returned pulse waveform 126. A separate return waveform 126 will be detected for every distinct magnetic field present along the waveguide 40.

Figure 14:
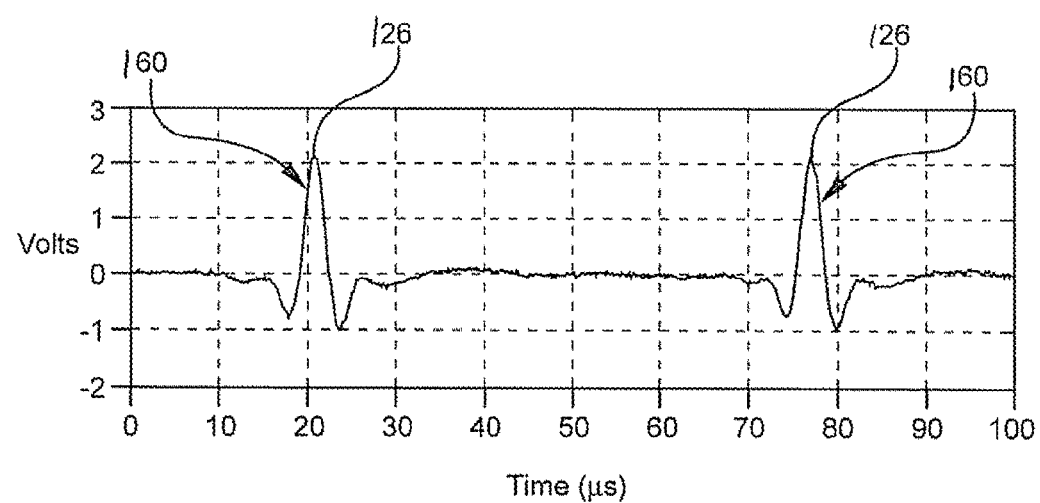
FIG. 14 shows waveforms sensed by a waveform detector.

FIG. 14 shows a typical raw analog returned waveform 126 sensed by the waveform detector 124. This signal contains two distinct pulse return waveforms 126 due to the positioning of two distinct permanent magnets targets 36 at separate locations along the magnetostrictive sensor transducer waveguide 40. Knowing the (constant) wave speed of the torsional waveforms, we can accurately estimate either the absolute or relative positions of the magnets from the characteristic timing of the returned pulse waveforms 126.

Figure 13A:
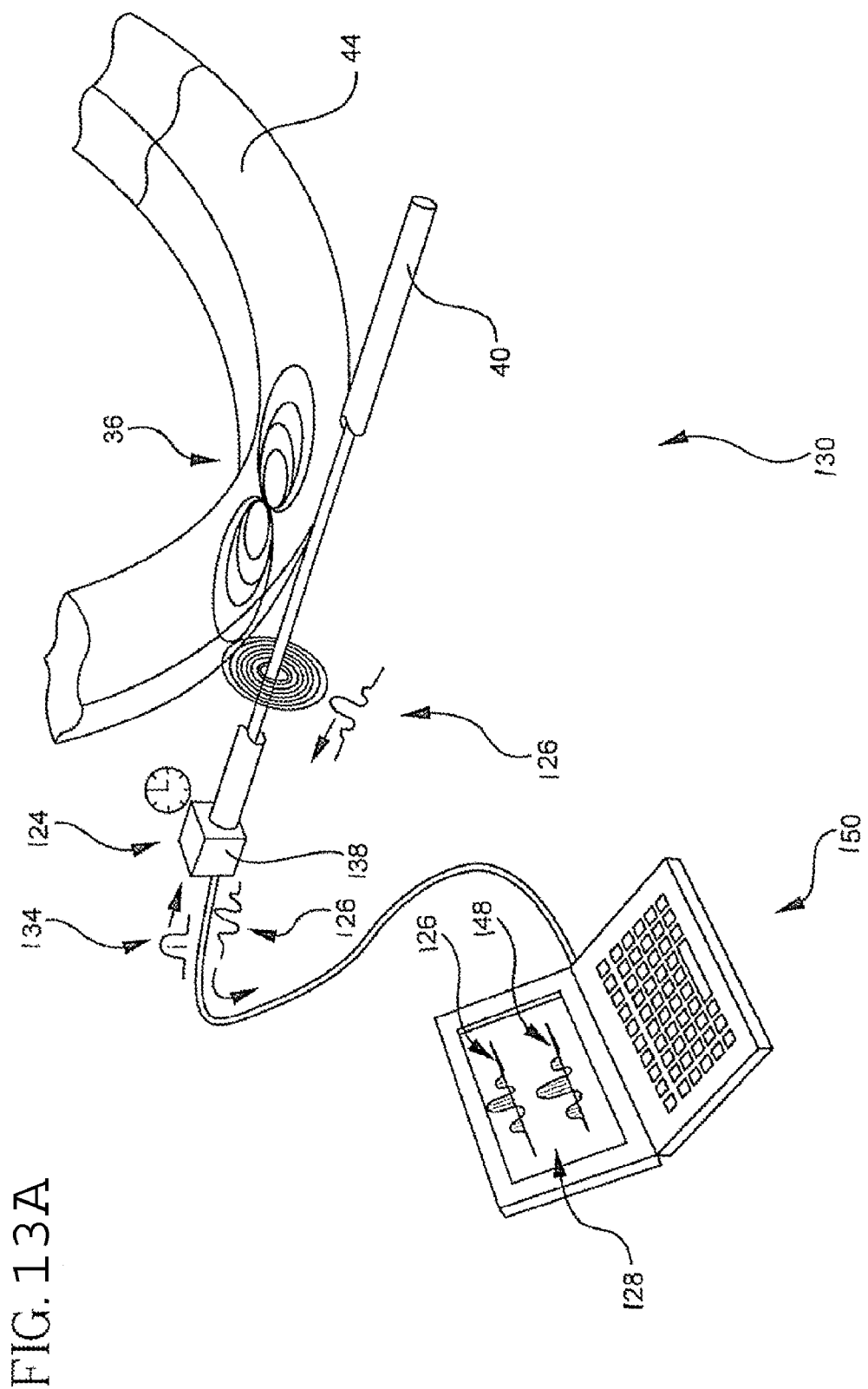
FIGS. 13A-13C illustrate sensor measurement systems and methods.
Figure 13B:
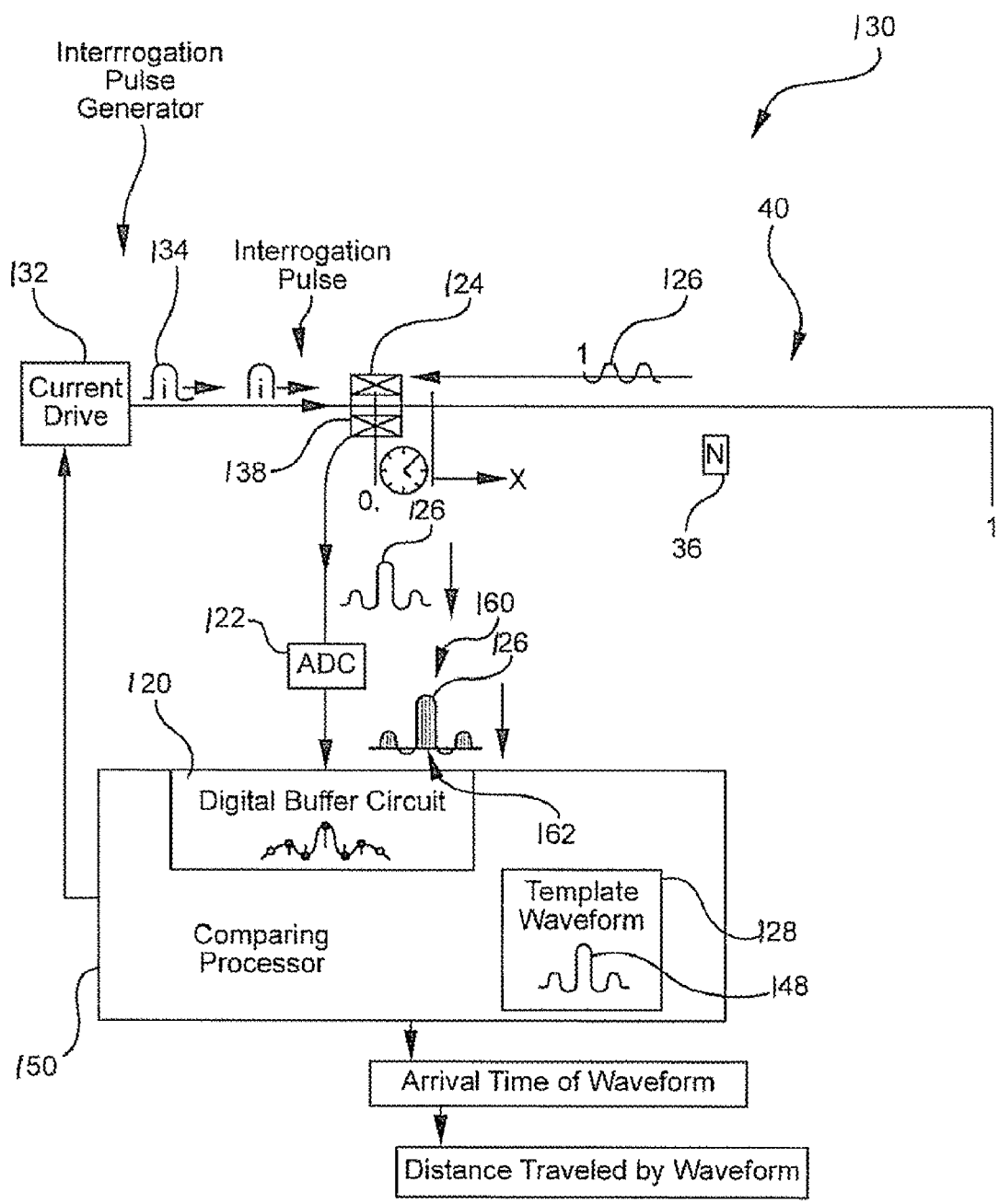
Figure 13C:
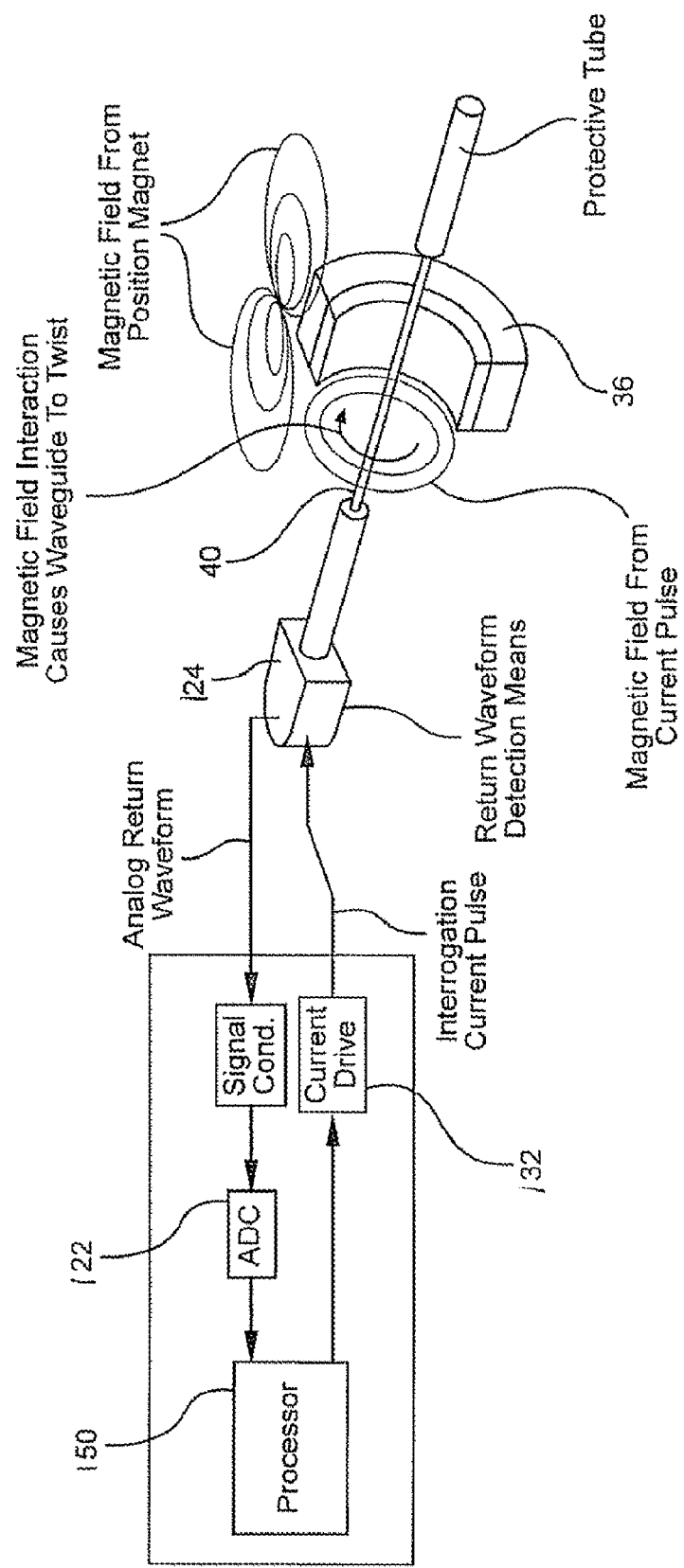

In embodiments the invention utilizes a simple buffer circuit 120 with the return waveform detector (magnetostrictive return waveform detector 124). This simple buffer circuit 120 can tolerate the high temperature environment of the aircraft system 22. Preferably the analog return waveform is signal conditioned, then digitally sampled and processed on a remotely located processor 150 to determine the characteristic timing. FIG. 13C shows a system schematic of this architecture using a magnetostrictive transducer.

For the aircraft system, each magnet target 36 has a fixed and known operating range of motion that translates to a fixed and known time window within which the associated return pulse will occur. As the timing diagram of FIG. 15 indicates (for a single return pulse), the A/D converter 122 is only enabled during the known time window, i.e. after a fixed time delay. The zero-crossing time is also shown in FIG. 15 for reference.

Figure 15:
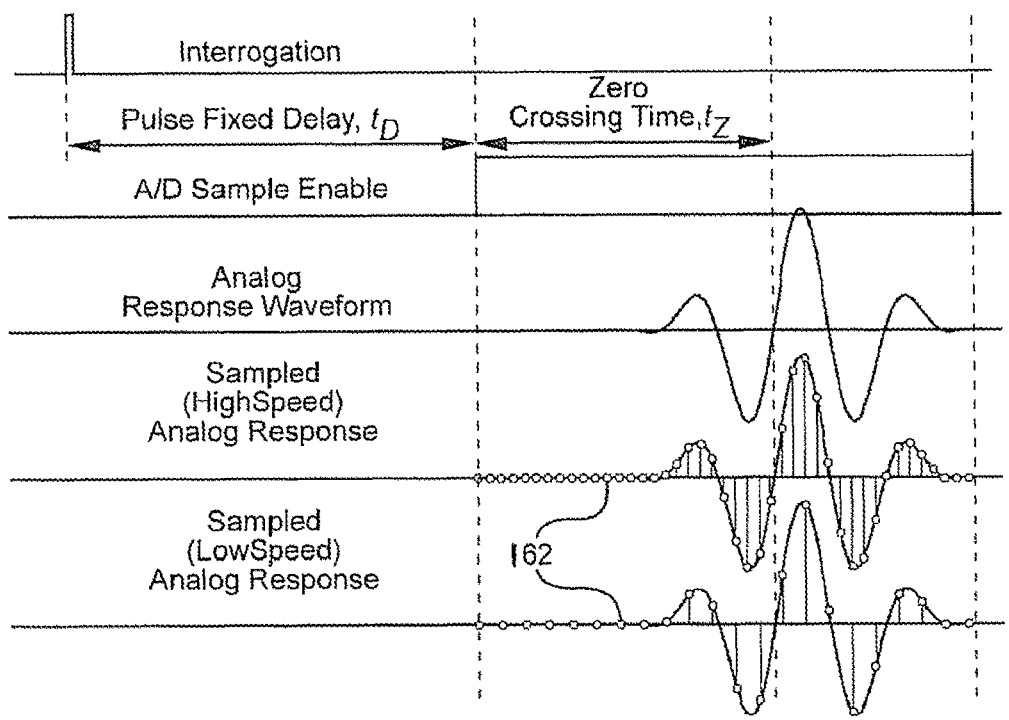
FIG. 15 illustrates a timing diagram for sampling rates.

The lower curves in FIG. 15 represent two alternative digital sampling schemes with a high speed periodic sampling rate 162 and a low speed periodic sampling rate 162. In the first example, a high-speed sample process captures data with a relatively high time resolution. Rather than rely on the integrity of a relatively small and inherently noise-prone subset of the sampled data (i.e. near zero crossings such as by determining the characteristic time from the high-speed digitally sampled data by looking for zero crossings in the data), this invention takes advantage of the entire buffer of data.

The preferred sampling approach for determining the characteristic time using the digitally sampled data is represented by the lower plot in FIG. 15, where the waveform is sampled at a low speed, providing a coarse time resolution. Preferably, the minimum sample rate should satisfy the Nyquist criterion for the return pulse. Based on typical return waveforms data as well as experimental measurements from commercially available magnetostrictive devices, the return waveforms can approximately be characterized as having a carrier frequency which is modulated by some finite duration envelope to form the resultant pulse as indicated in FIG. 16.

Typical magnetostrictive carrier frequencies range from 1150 kHz to 3150 kHz with envelope durations typically between 10 μs and 120 μs. A well-designed low speed periodic sample rate for this range of carrier frequencies is 2.0 MHz, resulting in about 6 to 13 samples per period of the carrier frequency. A typical interrogation current pulse rate is around 1 kHz, and a typical wave speed is about 10 μs/inch.

Figure 16:
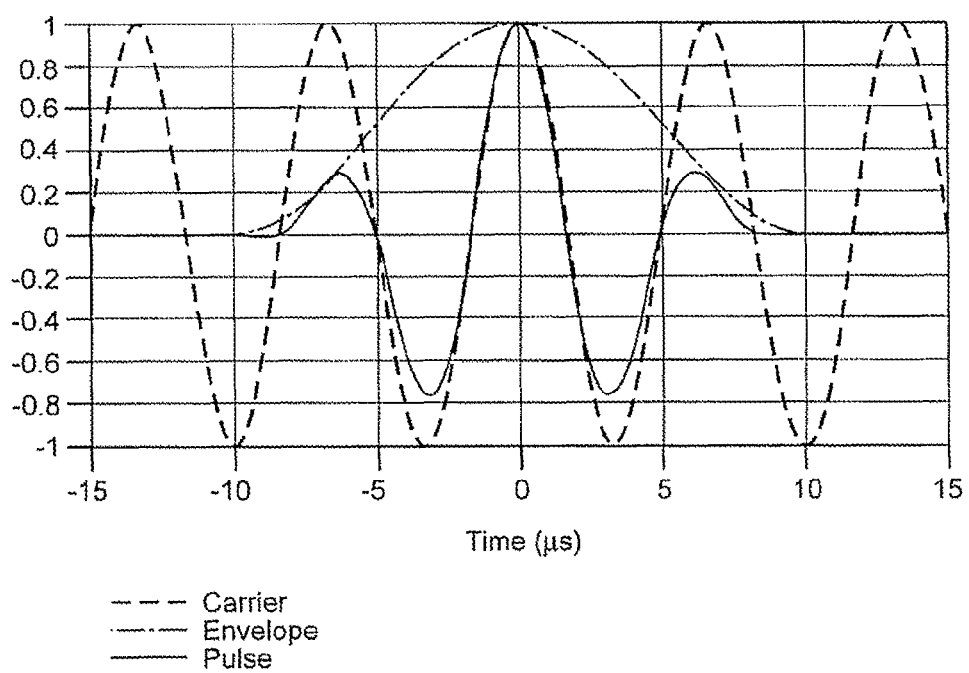
FIG. 16 illustrates return waveforms.

The return waveform pulse in FIG. 16 is shown symmetric about its center. This need not be the case in practice as governed by the symmetry of the envelope. Symmetric, anti-symmetric, and non-symmetric pulses are all handled by this invention. Note that the envelope has a finite extent in time, and outside of the envelope, the pulse is considered to be zero.

The typical return pulse waveforms from a magnetostrictive sensor have a similar resemblance to wavelet templates. A proper wavelet ψ(t) is a zero-mean continuous function with a finite extent which, when used in a signal processing framework, is dilated with a scaling parameter s and translated in time by τ.

$$\psi_{\tau,s}(t) = \psi\left(\frac{t-\tau}{s}\right) \quad (1)$$

The scaling parameter stretches or compresses the time scale whereas the translation parameter offsets the wavelet in time. In embodiments the invention includes the application of wavelets to the measuring of absolute or relative pulse timing in a magnetostrictive sensor by comparing and correlating the received returned pulse waveform 126 with the wavelet template waveform 128. Preferably maximum correlation between the template waveform 128 and the returned pulse waveform 126 is utilized to determine the return arrival time of the returned pulse waveform.

Figure 17:
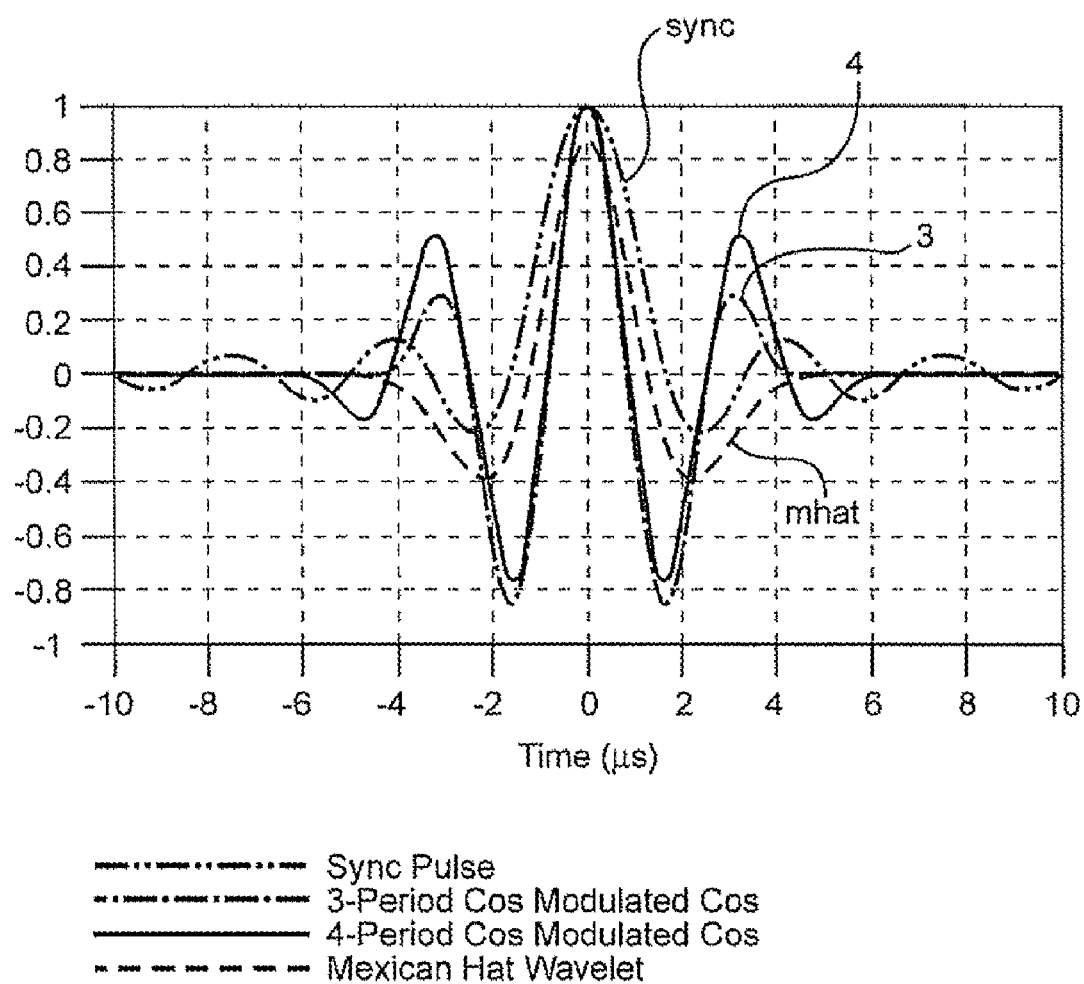
FIG. 17 shows plots of four example wavelets.

Preferably with this invention the variable scaling parameter is not utilized since the pulses generally always have a constant carrier frequency. A constant scaling can always be chosen for a given sensor type. It is also not required for this invention to use a mathematically proper wavelet, i.e. one that satisfies all the formal properties of a true wavelet. FIG. 17 shows a plot of four example wavelets that were used to verify the accuracy and robustness of this invention. In general, an appropriate wavelet template waveform should be chosen with respect to the characteristic return waveform for a particular sensor. The method of this invention is highly robust to the selection of wavelet template type, its amplitude and carrier frequency, and the amplitude variations of the raw signal itself. Each of the wavelets in FIG. 17 produced very similar results when used for determining the characteristic timing of the magnetostrictive return pulses.

The preferred embodiment for the aircraft system is to interrogate each magnetostrictive sensor at a 1 kHz rate (1000 μs sample period) and to digitally sample the data at a rate of about 2 MHz (about 0.5 μs sample period, 0.5±0.25 μs sample period), most preferably 1.5148 MHz (0.646 μs sample period). Note that two target magnets per sensor are present for this application with two return waveforms as shown in FIG. 14. Preferably the following steps are repeated in sequence at the interrogation rate:

Step 1: Outputting an interrogation current pulse 134 (1 μs duration) to the magnetostrictive transducer waveguide 40

Step 2: Wait for the first returned pulse 126 (122.5 μs or about 45 samples (45±25 samples) of the ADC clock, most preferably about 21 samples)

Step 3: Enable the ADC 122 and buffer up data (15 μs or 130 samples of the ADC clock)

Step 4: Wait for the second returned pulse 126 (45 μs or about 90 samples (90±45 samples) of the ADC clock, most preferably about 47 samples)

Step 5: Enable the ADC 122 and buffer up data (15 μs or 130 samples of the ADC clock)

At this point we have two separate buffers of digitally sampled data containing the returned pulse waveforms corresponding to the two magnetic targets. Next we process these buffers to determine the characteristic timing for each one. For each buffer:

Step 6: Determine the index (sample number) of the peak or central value in the data.

Step 7: Establish a search window (2-4 samples) around the index determined from Step 6.

Step 8: Estimate the wavelet template waveform translation time τ within the established search window that maximizes the correlation between the translated template wavelet and the sampled data.

Preferably here we implicitly define the characteristic timing to be the optimal translation time. Once the optimal wavelet template translation times are determined for each of the two buffers, the pulse-to-pulse (relative) timing, or interrogation-to-pulse (absolute) timing can be computed using knowledge of when the buffers were sampled relative to the interrogation pulse.

Preferably the invention includes the implementation of Step 8. There are several ways of implementing Step 8 to achieve a desired accuracy and robustness level. To clarify this method further, we begin with a brute force approach applied to the example shown in FIG. 18.

The upper plot in FIG. 18 represents an example analog return waveform that has been digitally sampled as a buffer of 120 samples. For this example, a symmetric cosine-modulated cosine wavelet (see FIG. 17) was selected to represent the synthesized return template waveform 128. We can define the center point of this wavelet to be the characteristic time as indicated by the vertical line CP in the upper plot FIG. 18A. Notice that the characteristic time generally does not occur at one of the sample times.

The objective of Step 8, for this example, is to determine the characteristic time using only the 120-sample time buffer data as input by comparing the received returned pulse waveform with the wavelet template waveform. Define the digitally sampled return waveform buffer to be:

$$r=[r_1 \ldots r_n \ldots r_{20}]^T \qquad (2)$$

Applying Step 6 to the example buffer in FIG. 18, we see that the peak value in the data occurs at sample number 12. From Step 7, we next establish a search window of two samples on either side of the peak, as indicated by the shaded crosshatched region in the plot of FIG. 18A. To implement Step 8, we first select a wavelet template 128 that approximates the sampled return pulse waveform. For this example, the Mexican Hat wavelet template was chosen.

We next select a translation time $\tau$ such that the wavelet template is centered at the leftmost edge of the search window. A second buffer of data is generated by numerically sampling the continuous wavelet template to match the temporal sampling of the returned waveform buffer. Define the digitally sampled wavelet template buffer to be:

$$w(\tau)=[w_1 \ldots w_n \ldots w_{20}]^T \qquad (3)$$

Using these two buffers, we next compute a performance metric, such as a correlation function or a quadratic error cost function to compare the received returned pulse waveform with the template waveform. These two metrics are defined as:

$$J_{correlation}(\tau)=w(\tau)^T r=r^T w(\tau) \qquad (4a)$$

$$J_{quadratic}(\tau)=(w(\tau)-r)^T(w(\tau)-r) \qquad (4b)$$

Figure 18A:
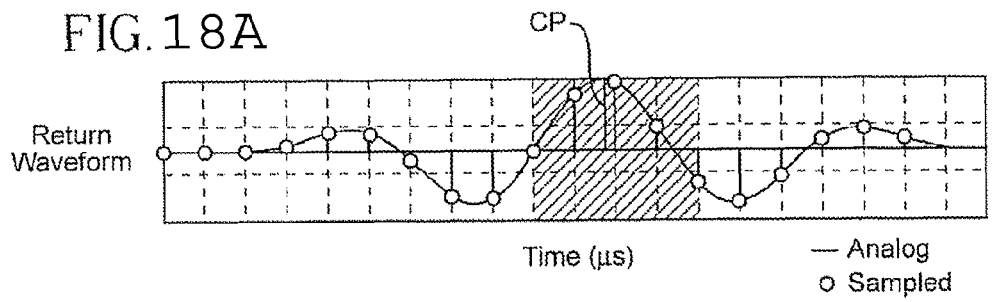
FIGS. 18A-18D illustrate waveform and wavelet plots.
Figure 18B:
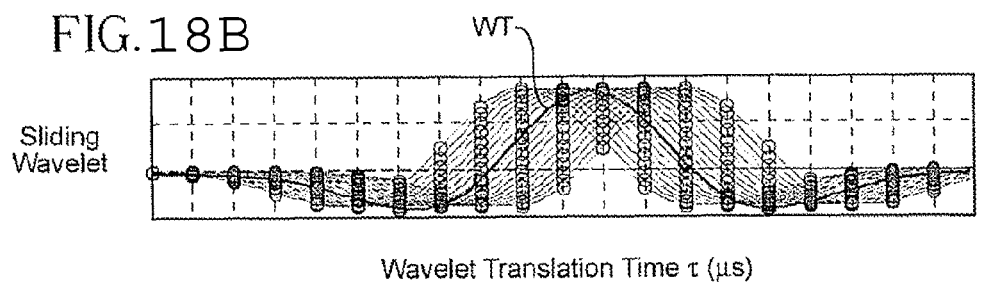
Figure 18C:
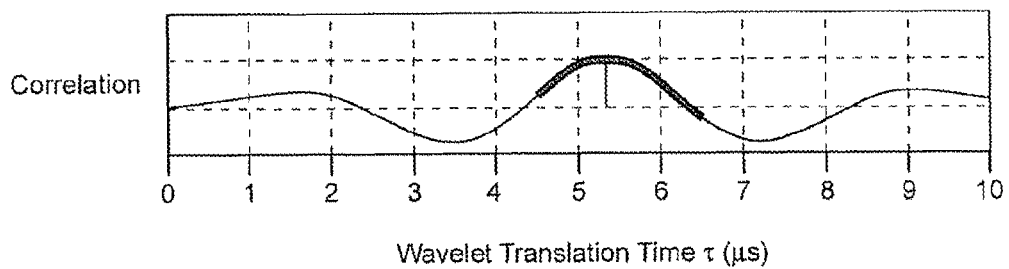
Figure 18D:
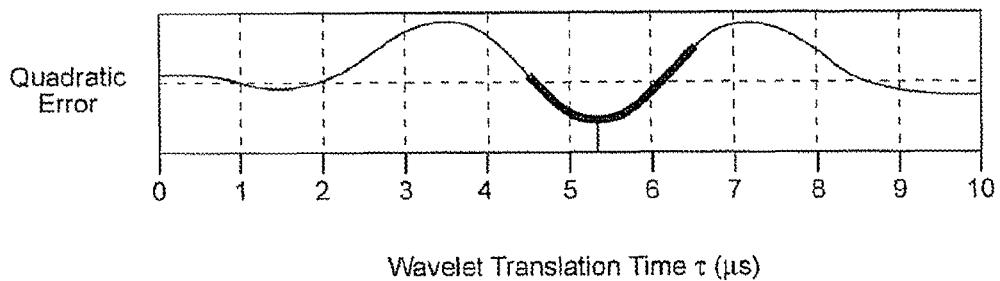

In the case of the correlation metric (4a), we wish to determine the translation time that maximizes the metric (FIG. 18C), and in the case of the quadratic error metric (4b), we wish to minimize the metric (FIG. 18D). Both comparisons lead to complementary results as indicated in FIG. 18C-D.

At this point we only have a single point in our performance metric. In order to find the minimum (or maximum), we need to compute more points. One way to do this is to "slide" the wavelet template from the leftmost edge of the search window to the right most edge in small discrete time steps, while computing the comparing performance metric at each translation time. The time steps for sliding the wavelet template should be chosen at the same resolution as the desired accuracy of the measurement. An example of this wavelet sliding process is depicted in FIG. 18B.

Once the performance metric is computed over the search window, it is easy to find a comparing extremal value, i.e. a minimum or maximum. As long as the search window is not chosen too large, the extreme point will be unique. The translation time associated with the extreme metric is the characteristic time that maximizes the correlation between the wavelet and the sampled data. For this example, the wavelet template with the optimal translation time is highlighted in bold and labeled WT in the plot of FIG. 18B.

As mentioned above, this brute force method will certainly produce a desirable result, but at considerable computational expense. A significant portion of that expense comes from direct evaluation of the continuous wavelet function to generate the sampled wavelet data buffer of equation (3). One potential means for reducing this expense is to pre-compute a set of sampled wavelet templates at a fine translation time resolution, but only sliding the wavelet from one sample period to the next sample period of the raw waveform sample rate. Mathematically, we can pre-compute the following matrix:

$$W=[w(kt_s)w(kt_s+\Delta\tau)w(kt_s+2\Delta\tau) \ldots w((k+1)t_s)] \qquad (5)$$

where $t_s$ is the sample period of the low-speed sample process, k is the low-speed sample index, and $\Delta\tau$ is the incremental translation time offset for each step. The data in this matrix can be used to cover a range of translation times either with appropriate zero padding or by extracting an appropriate subset of data.

Another significant portion of the computational expense comes from the generation of the performance metric over a range of translation times. Considerable computational savings can be realized using the bisection method to search for optimal wavelet alignment rather than brute-force sliding. The bisection method entails continuously subdividing the search interval until changes in the subsequent cost function calculations drop below a defined threshold. FIG. 19A is an example Matlab script for sliding a wavelet template waveform 128 (syncgen) over the buffered data (buf1) of a received returned pulse waveform 126 according to the bisection method.

The method was applied to actual returned pulse waveforms 126 produced from a commercially available magnetostrictive sensor. FIG. 19B is an example from a typical data set showing how the bisection method searches the cost function for the minimal value. In this example, the computation steps were reduced by two orders of magnitude (to 10-15 temporal moves of the wavelet). Note from FIG. 19B that the bisection method does not always step in the optimal direction. Consequently, more sophisticated algorithms can be employed that further reduce the computational steps by a factor of two or so. But these typically require more computationally intensive estimations of a gradient—the bisection method is, in comparison, computationally simple.

Figure 20:
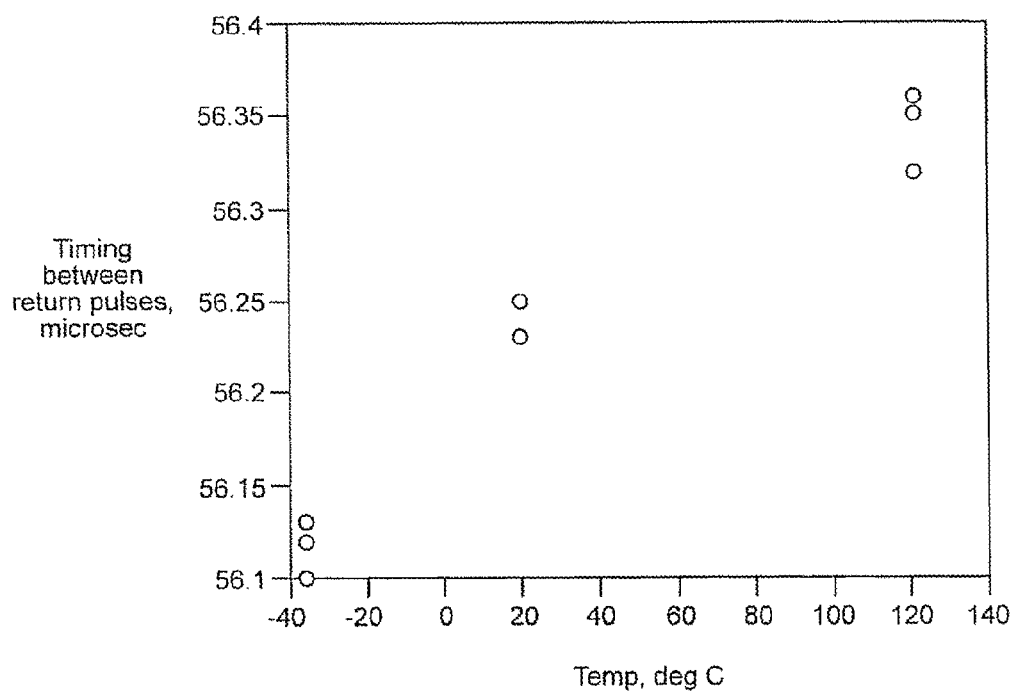
FIG. 20 shows a plot of timing between return pulses versus temperature.

The present invention provides for extending the temperature range of magnetostrictive probes and allowing improved accuracy and precision in magnetostrictive measurements. FIG. 20 shows the present invention applied to data taken on a commercially available magnetostrictive sensor 40. Three data points were taken at each of three temperatures. The y-axis corresponds to the time between two pulses corresponding to two magnets 36 located along the magnetostrictive sensor waveguide probe at about 168 mm apart. The value spread at any given temperature is less than 0.05 μs corresponding to less than 0.15 mm. The slope of the data points with temperature is consistent with typical magnetostrictive wave speed temperature coefficients of about 2-3 ppm/in/° F. Typical magnetostrictive sensor waveguide probes have a maximum upper temperature use range no greater than 100° C. because of decreased signal amplitude and quality at temperature extremes. The present invention is shown to provide calibration-worthy results above 100° C., and preferably up to 121° C.

Figure 21:
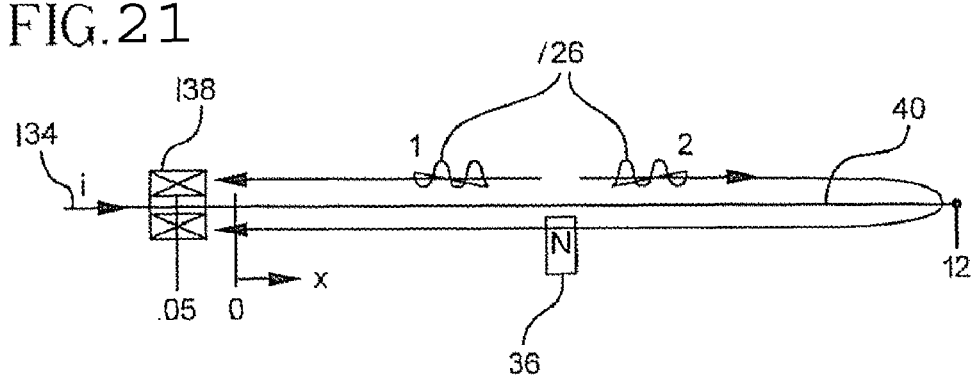
FIG. 21 illustrates a schematic of a magnetostrictive sensor.
Figure 22:
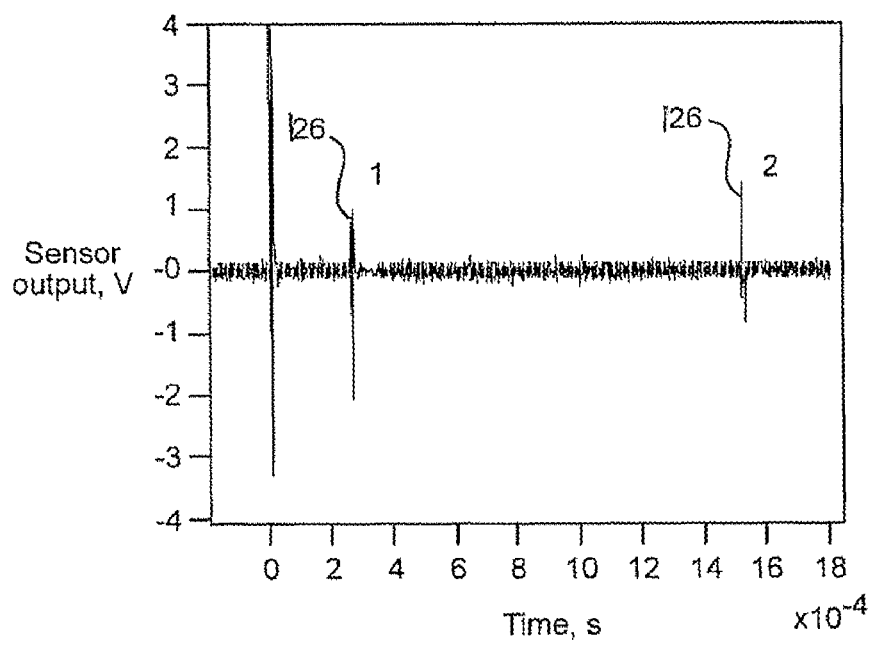
FIG. 22 illustrates a sense coil output.

A schematic of a magnetostrictive sensor is shown in FIG. 21. A magnetostrictive waveguide wire 40 passes through a sense coil 138. Interrogation pulses 134 are applied to the magnetostrictive waveguide wire 40 creating a toroidal magnetic field. This magnetic field interacts with a target position magnet 36 and creates torsional waves that travel in both directions along the waveguide 40 from the location of the magnet 36. Torsional wave 1 first passes through the sense coil 138 followed by torsional wave 2 after reflection (and inversion) off the end of the wire 40. FIG. 22 shows a typical sense coil output 138. The first large response corresponds to the current interrogation pulse 134 passing through the coil 138 (this will be referred to as current noise), followed by returned waveform pulses 126 corresponding to torsional waves 1 and 2.

As the magnetic target 36 moves close to the coil 138, wave 1 begins interacting with and ultimately becomes buried in the current noise. For a typical magnetostrictive sensor, this interaction forces a dead-zone within 2.5 inches of the coil.

Figure 23:
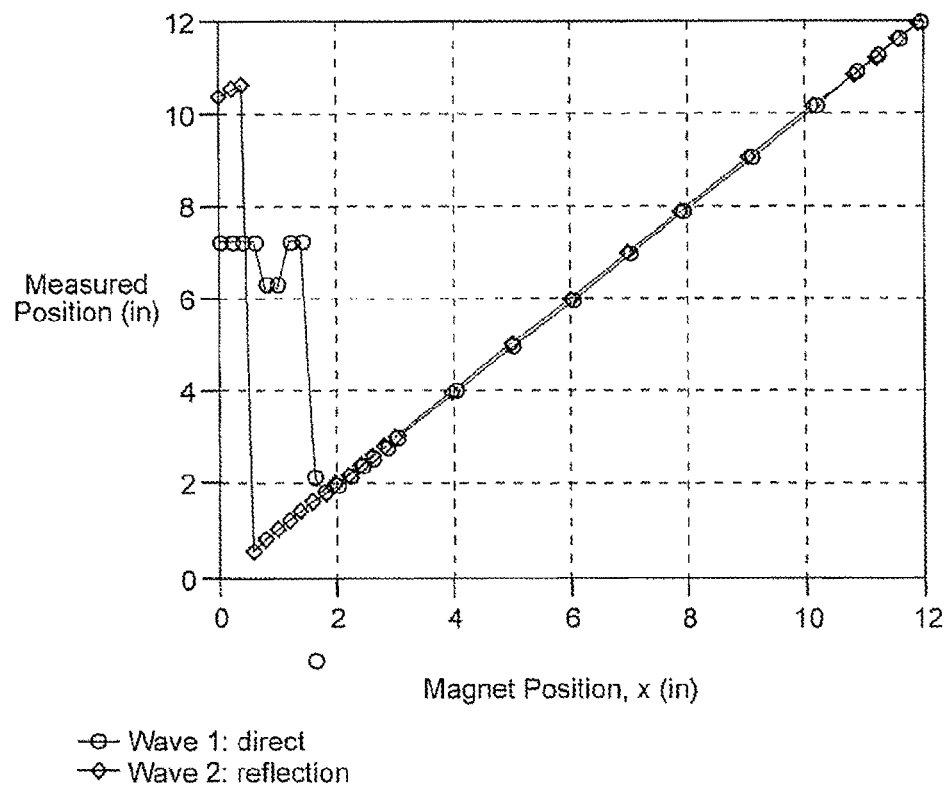
FIG. 23 illustrates a plot of the measured position versus magnet position.

However, this dead-zone can be reduced substantially by using wave 2 instead of wave 1 for timing purposes, particularly when the target magnet 36 is near the coil 138. FIG. 23 illustrates this and shows the reduction in dead zone resulting from use of the end of the waveguide reflected waveform. Magnet position x=0 corresponds to a magnet position at about 0.5 inches from the sense-coil center. Therefore, it can be seen that using the reflected wave 2 allows measurement to a point at about 1.0 inch from the coil, whereas use of wave 1 allows for a reasonable measurement only beyond about 2.5 inches from the coil.

The template waveform comparison signal processing of the invention is effective at nearly eliminating the dead-zone on the termination end of the magnetostrictive sensor waveguide probe.

Figure 24:
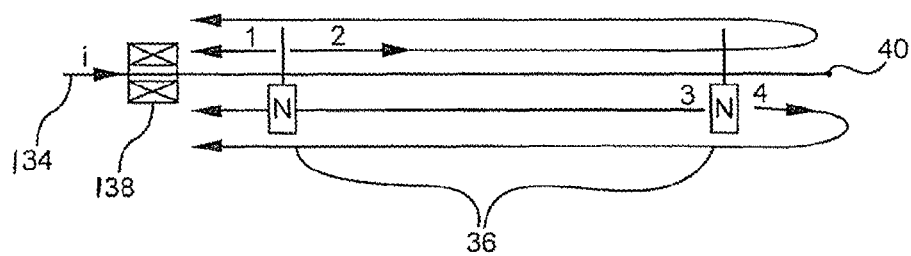
FIG. 24 illustrates the propagation of torsional waves in magnetostrictive waveguide sensor with two target magnets.
Figure 25:
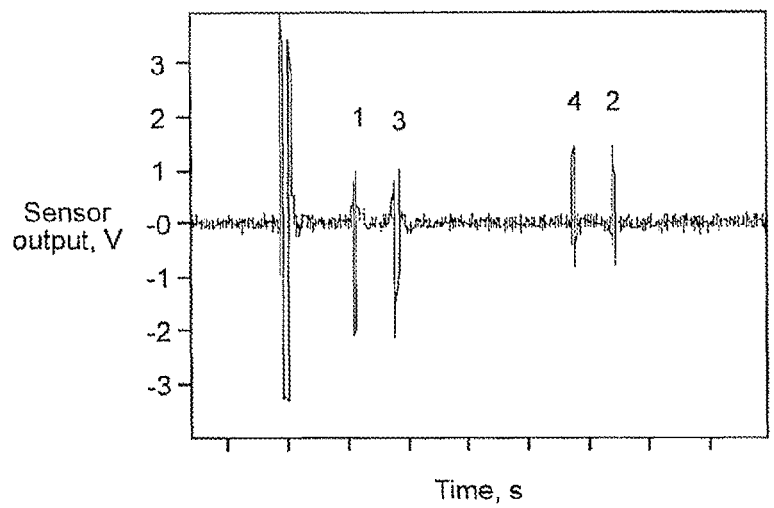
FIG. 25 shows the four returned waveform pulses from two target magnets.

For the coupling angular misalignment measurement aircraft system, preferably two magnetic targets 36 are used one for each hub member 32, 34. Therefore the sensor schematic and corresponding coil output look like that shown in FIGS. 24 and 25. FIG. 24 illustrates the propagation of torsional waves in magnetostrictive waveguide sensor 40 with two target magnets 36. FIG. 25 shows the four returned waveform pulses from the two target magnets 36. Based on the above discussion it is preferred to use torsional wave 2 to minimize the sensor dead length. Since the other magnet is not proximal to the coil 138, either wave 3 or 4 may be used. Therefore the distance between the two magnets may be calculated by:

$$d = c(t_2 - t_4) \qquad (6)$$

where $t_2 - t_4$ is the relative timing between waves 4 and 2, and c is the material wave-speed. The other torsional waves (1 and 3) are preferably used to corroborate the measurement. In a preferred embodiment torsional waves 1 and 3 are used to determine the position of the two target magnets 36 in that these received returned pulse waveforms have larger amplitudes, such as shown in FIGS. 24 and 25.

The length of the interrogation current pulse 134 is preferably on the order of 1-2 μs in duration, such as 1 μs±10 ns or 1.15±0.15 μs. Methods such as zero-cross detection would have a problem with such variability in the interrogation pulse but the robustness of the present invention provides for such a large range tolerance. Preferably the interrogation pulse duration is in the range of about 0.9-2 μs. Preferably the interrogation pulse has a variable interrogation pulse duration with the magnetostrictive interrogation pulse generator providing for the output of a pulse duration in the range of about 0.9-2 μs.

The method of template waveform comparison utilizes searching to find the characteristic times. The bisection method is a method for root finding. This is not what is necessarily needed using template wavelets with magnetostrictive sensors since we are not necessarily looking for zero-crossings. In practice we wish to find the time at which a template wavelet best matches the buffered data. Thus it is a correlation and we wish to maximize the correlation to find the optimal and very accurate characteristic time. Finding the maximum of this correlation function is a one-dimensional maximization problem in which one preferably brackets the maximum.

One method for minimization or maximization of a function in one dimension is the Golden Section Search. In both the bisection and Golden Section Search methods one preferably brackets the solution. The subtle difference between the two methods is that in bisection, the solution, or root, is bracketed by a pair of points, a and b, when the function has opposite signs at those two points. For the minimization or maximization problem one cannot rely on a zero-crossing or root. Instead one preferably defines three points such that a<b<c such that f(b)<f(a) and f(b)<f(c).

Finding the minimum or maximum of a function can be reduced to a root-finding problem if one takes the derivative of the function. In that case the bisection method can be employed as an alternative embodiment.

For continuous functions the solution is not bounded by the processor's floating-point precision. It is given by Taylor's theorem $f(x) \approx f(b) + \frac{1}{2} f''(b)(x-b)^2$) and understanding this equation helps to minimize the total number of bisections allowed. A typical value used for the search tolerance is the square root of the processor's floating-point precision.

Figure 26:
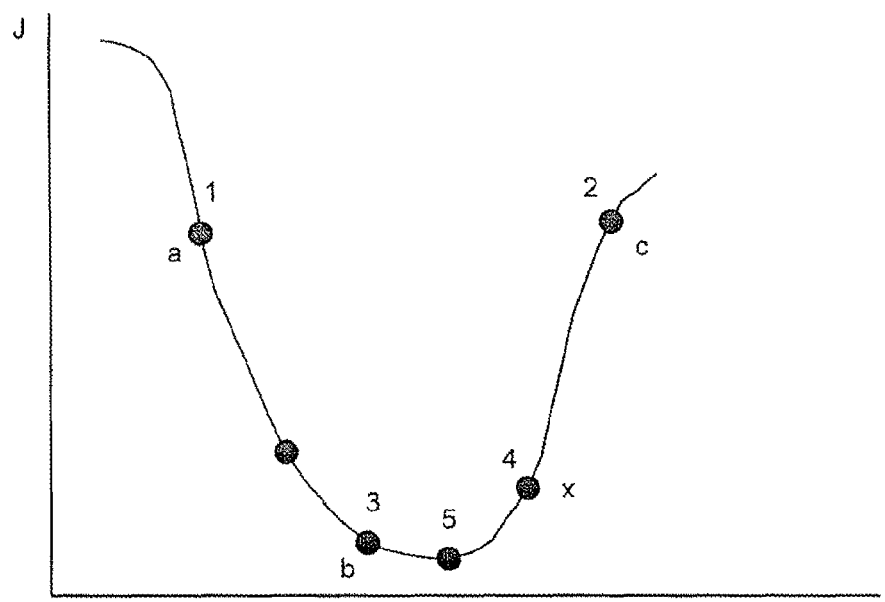
FIG. 26 shows a Golden Section Search for the minimum of a solution.

While many bisection and Golden Section Search method solutions will ultimately be bounded by some small floating point number due to the continuous nature of the function, the discrete nature of this invention implies that the solution is bounded by discrete sampling points. FIG. 26 (Minima Search for Cost Function J) shows a Golden Section Search for the minimum of a cost function J.

The comparing search method preferably begins by choosing points 1, 2, and 3 such that f(3)<f(2) and f(3)<f(1). Then a point 4 is chosen either in between points 1 and 3 or points 3 and 2. We find that f(4)<f(2) but f(4)>f(3). Therefore point 3 is still the middle point in our search but the outer bounds are now points 1 and 4. Now choose a point between points 1 and 3 or points 3 and 4. We find that f(5)<f(3) and f(5)<f(4) so this becomes our new middle point. In all cases the middle point of the new set of three points is the point whose ordinate is the best minimum achieved so far. Now we must choose a point between points 3 and 5 or 5 and 4. The comparing search is terminated when a predetermined number of search iterations have been completed (to limit processor burden) or when either the minimum has been bounded by some criteria on the abscissa, or the distance between interior points is greater than the inverse of the number of pre-computed wavelet buffers.

In this search the points 1, 2, 3, and 4 can be floating point numbers. However the abscissa is then discretized to the basis corresponding to the number of wavelet buffers so that the appropriate wavelet is used to evaluate the cost function.

With the Golden Section Search method the choice of the point 'x' (as shown in FIG. 26) should be 138.197% (the golden ratio) of the distance from the middle point in the search window into the larger of the two intervals a-b and b-c. Regardless of the initial conditions of the search, it will converge to this ratiometric searching so long as successive points are chosen using the golden ratio rule. The convergence to a minimum is linear and not quite as good as the bisection method (which uses a ratio of 150%).

In the aircraft system 22 we know the physical configuration of the magnetostrictive sensor 40 and the target magnet 36 in the system we choose the outer brackets 'a' and 'c'. These points are the beginning and ending samples of our search window (as described in Step 7 above). We choose a point 'b' within this bracket for the third point and then apply the golden section search. Since we must compute the peak value in the search window in the aircraft application, we can use this as point 'b'.

There are many other numerical methods that can be used to solve the one-dimensional minimization problem (and many more for multidimensional problems) for comparing the returned pulse waveform 126 with the template waveform 128. For example, Brent's method is quicker than the Golden Section Search method but fails if the three chosen points are collinear. For this reason both methods are preferably employed together in practice using logic to switch between the two as required.

A more computationally burdensome method is the brute-force method in which the cost function is analyzed for every precomputed wavelet buffer.

Whichever search method is employed, the characteristic time is the time corresponding to the wavelet centroid for which the cost function is minimized (or the correlation function is maximized).

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A method of monitoring a shaft system, said method comprising providing a shaft system with a rotating member with a magnetic sensor target, providing a sensor rigid measurement system with a magnetostrictive sensor proximate said rotating member sensor target while inhibiting a physical contact between said measurement system magnetostrictive sensor and said rotating member, providing an interrogation pulse generator, providing a waveform detector for receiving a returned magnetostrictive pulse waveform, providing a template waveform, outputting an interrogation pulse from said interrogation pulse generator, receiving a returned magnetostrictive pulse waveform, and comparing said received returned magnetostrictive pulse waveform with said template waveform to determine a return time of said returned magnetostrictive pulse waveform to magnetostrictively measure a characteristic of said rotating member to monitor a performance of said shaft system.

2. A method of measuring a rotating shaft, said method comprising providing a shaft with a rotating member with a sensor target, providing a sensor measurement system with a magnetostrictive sensor proximate said rotating member sensor target while inhibiting a physical contact between said measurement system magnetostrictive sensor and said rotating member, said sensor measurement system including an interrogation pulse generator, a waveform detector for receiving a returned magnetostrictive pulse waveform, and a template waveform, outputting an interrogation pulse from said interrogation pulse generator into said magnetostrictive sensor, receiving a returned magnetostrictive pulse waveform from said magnetostrictive sensor, and comparing said received returned magnetostrictive pulse waveform with said template waveform to determine a return time of said returned magnetostrictive pulse waveform to magnetostrictively measure a rotating positional characteristic of said rotating member to measure said rotating shaft.

3. A method of measuring a rotating shaft, said method comprising providing a shaft with a first rotating member with a sensor target and a second rotating member with a sensor target, providing a sensor measurement system with at least a first magnetostrictive sensor proximate said first rotating member sensor target and said second rotating member sensor target, said sensor measurement system including an interrogation pulse generator, a waveform detector for receiving a returned magnetostrictive pulse waveform, and a template waveform, outputting an interrogation pulse from said interrogation pulse generator into said magnetostrictive sensor, receiving returned magnetostrictive pulse waveforms from said magnetostrictive sensor, and comparing said received returned magnetostrictive pulse waveforms with said template waveform to determine return times of said returned magnetostrictive pulse waveforms to measure a plurality of distances of said first rotating member sensor target and said second rotating member sensor target.

4. A method as claimed in claim 3 wherein said first rotating member sensor target is a disk and said second rotating member sensor target is a disk.

5. A rotating shaft measurement system for noncontactingly monitoring a rotating member including a sensor target, said rotating shaft measurement system including a sensor rigid collar comprised of at least a first magnetostrictive sensor, said first magnetostrictive sensor rigidly fixed on said sensor rigid collar proximate said rotating member, said sensor rigid collar measurement system first magnetostrictive sensor magnetostrictively monitors a position of said rotating member sensor target to provide a measurement of a dynamic rotating positional characteristic of said rotating member, said measurement system including an interrogation pulse generator, a waveform detector for receiving a returned magnetostrictive pulse waveform, and a template waveform, said interrogation pulse generator outputting an interrogation pulse from said interrogation pulse generator into said magnetostrictive sensor, said waveform detector receiving a returned magnetostrictive pulse waveform from said magnetostrictive sensor for comparison with said template waveform.

6. A system as claimed in claim 5 wherein said first magnetostrictive sensor is a magnetically biased magnetostrictive sensor.

7. A system as claimed in claim 5 wherein said system has a temperature use range greater than 100° C.

* * * * *